US011531778B2

(12) United States Patent
Yin

(10) Patent No.: US 11,531,778 B2
(45) Date of Patent: Dec. 20, 2022

(54) PRIVACY DATA REPORTING METHOD AND APPARATUS, AND STORAGE MEDIUM

(71) Applicant: HUAWEI TECHNOLOGIES CO., LTD., Shenzhen (CN)

(72) Inventor: Han Yin, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 77 days.

(21) Appl. No.: 17/155,284

(22) Filed: Jan. 22, 2021

(65) Prior Publication Data
US 2021/0141922 A1 May 13, 2021

Related U.S. Application Data

(63) Continuation of application No. PCT/CN2019/087198, filed on May 16, 2019.

(30) Foreign Application Priority Data

Jul. 27, 2018 (CN) .......................... 201810845018.X

(51) Int. Cl.
*G06F 21/00* (2013.01)
*G06F 21/62* (2013.01)
*H04L 9/06* (2006.01)

(52) U.S. Cl.
CPC ...... *G06F 21/6227* (2013.01); *G06F 21/6254* (2013.01); *H04L 9/0643* (2013.01)

(58) Field of Classification Search
None
See application file for complete search history.

(56) References Cited

U.S. PATENT DOCUMENTS 9,705,908 B1   7/2017 Thakurta et al.
2017/0039387 A1* 2/2017 Leonardi ............ G06F 21/6245
(Continued)

FOREIGN PATENT DOCUMENTS

CN    101594227 A    12/2009
CN    103607393 A     2/2014
(Continued)

OTHER PUBLICATIONS

Qin Xiaofei, Discussion on Privacy Data Protection Algorithms of Telecom Operators. Electronics World, 2013, 3 pages, including English-language Abstract.

*Primary Examiner* — Andrew J Steinle
(74) *Attorney, Agent, or Firm* — Maier & Maier, PLLC

(57) ABSTRACT

Embodiments disclose a privacy data reporting method and apparatus, and a storage medium. The method includes: A terminal device obtains to-be-reported data, divides the to-be-reported data into front string data and rear string data based on a preset step, separately scrambles the front string data and the rear string data, and sends the generated privacy data to a server. The server receives privacy data sent by a plurality of terminal devices, determines N pieces of first front string data, then obtains M pieces of to-be-reported data based on a plurality of pieces of privacy data, and finally determines to-be-reported data whose reporting rate is greater than a first preset value as target to-be-reported data. In an exemplary embodiment, the terminal device divides the to-be-reported data into two parts, and separately scrambles the two parts to generate the privacy data.

20 Claims, 19 Drawing Sheets

(56) References Cited

U.S. PATENT DOCUMENTS

2017/0161439 A1 6/2017 Raduchel et al.
2018/0097620 A1 4/2018 Kisley et al.

FOREIGN PATENT DOCUMENTS

| CN | 104052658 | A | * | 9/2014 |
| CN | 104052658 | A | | 9/2014 |
| CN | 104850793 | A | * | 8/2015 |
| CN | 104850793 | A | | 8/2015 |
| CN | 105608388 | A | | 5/2016 |
| CN | 106407841 | A | * | 2/2017 |
| CN | 106407841 | A | | 2/2017 |
| WO | 2009143749 | A1 | | 12/2009 |

* cited by examiner

PRIVACY DATA REPORTING METHOD AND APPARATUS, AND STORAGE MEDIUM

CROSS-REFERENCE TO RELATED APPLICATIONS

This application is a continuation of International Application No. PCT/CN2019/087198, filed on May 16, 2019, which claims priority to Chinese Patent Application No. 201810845018.X, filed on Jul. 27, 2018. The disclosures of the aforementioned applications are hereby incorporated by reference in their entireties.

TECHNICAL FIELD

Embodiments relate the field of data processing technologies, and in particular, to a privacy data reporting method and apparatus, and a storage medium.

BACKGROUND

To improve an end user's experience, it is necessary to collect user data for intelligent analysis. For example, a server collects a plurality of pieces of user data for analysis to improve user experience. However, a privacy issue is still under heated discussion. For example, during collection of a topic that a user is concerned about or an application installed on a user terminal, sensitive information of the user such as a state of illness and a religious belief may be known.

To prevent leakage of user privacy, in an existing technology, when a terminal reports, to a server, data unknown to the server, the terminal divides the to-be-reported data into letter combinations of an equal length, scrambles each letter combination, and reports a scrambled letter combination. When obtaining an association relationship between different letter combinations, the server needs to calculate conditional probabilities between scrambled letter combinations.

However, for data that cannot be divided into letter combinations of an equal length, matching accuracy in the existing technology is low. In addition, when obtaining an association relationship between different letter combinations, the server needs to calculate a conditional probability of a scrambled letter combination reported by each user. As a result, performance overheads are relatively high.

SUMMARY

Embodiments provide a privacy data reporting method and apparatus, and a storage medium, to report sensitive information accurately and reduce performance overheads of data reporting.

According to a first aspect, an embodiment provides a privacy data reporting method, including:

a terminal device obtains to-be-reported data; divides the to-be-reported data into front string data and rear string data based on a preset step, where a length of the front string data is an integer multiple of the preset step, and the rear string data is data in the to-be-reported data other than the front string data; and separately scrambles the front string data and the rear string data according to a preset scrambling algorithm, to generate privacy data, and finally sends the generated privacy data to a server.

Beneficial effects include: The terminal device divides the to-be-reported data into two parts, and separately scrambles the two parts to generate the privacy data; and the server matches the privacy data sent by the terminal device with the to-be-reported data in two directions, namely, a head direction and a tail direction. In this way, matching accuracy and a matching speed are high.

Optionally, the privacy data may include scrambled front string data and scrambled rear string data. In this case, that a terminal device separately scrambles the front string data and the rear string data according to a preset scrambling algorithm, to generate privacy data may be implemented in the following manner. The terminal device first determines, based on a preset hash function, a first hash value corresponding to the front string data and a second hash value corresponding to the rear string data; and then generates, according to the preset scrambling algorithm, scrambled front string data corresponding to the first hash value and scrambled rear string data corresponding to the second hash value. In this way, the front string data can be associated with the rear string data; and when performing data matching, the server does not need to calculate a conditional probability of each piece of privacy data. This simplifies a matching process and reduces matching complexity.

That the terminal device determines, based on a preset hash function, a first hash value corresponding to the front string data and a second hash value corresponding to the rear string data may be implemented in the following manner. The terminal device first determines, based on the preset hash function, the first hash value of the front string data; and then determines, based on the preset hash function, the second hash value of data formed by the first hash value and the rear string data.

That the terminal device generates, according to the preset scrambling algorithm, scrambled front string data corresponding to the first hash value and scrambled rear string data corresponding to the second hash value may be implemented in the following manner.

First, the terminal device generates, based on the first hash value and a quantity m of elements in a preset Bloom filter vector, a first row vector with m elements, where the $(k1)^{th}$ element in the first row vector is 1, a remaining portion of elements are 0, and a value of k1 is equal to the first hash value; and then generates, based on the second hash value and a quantity m of elements in a preset Bloom filter vector, a second row vector with m elements, where the $(k2)^{th}$ element in the second row vector is 1, a remaining portion of elements are 0, and a value of k2 is equal to the second hash value.

Then, the terminal device generates, based on a preset scrambling rate, a third row vector with m elements, where a proportion of elements 1 in the third row vector is equal to the preset scrambling rate, and the elements 1 and elements 0 in the third row vector are randomly and evenly distributed. In this case, the terminal device determines the scrambled front string data based on the first row vector and the third row vector, and determines the scrambled rear string data based on the second row vector and the third row vector. For example, the terminal device performs an exclusive OR operation on the first row vector and the third row vector to generate the scrambled front string data, and performs an exclusive OR operation on the second row vector and the third row vector to generate the scrambled rear string data.

Optionally, the privacy data may further include the length of the front string data, a length of the rear string data, and the preset hash function.

Beneficial effects include: The front string data and the rear string data are separately scrambled by using the Bloom filter vectors, to accurately determine the scrambled front string data and the scrambled rear string data. In addition, a whole scrambling process is simple and easy to implement.

According to a second aspect, an embodiment provides a privacy data reporting method, including:

a server receives privacy data sent by a plurality of terminal devices; determines N pieces of first front string data, where a length of the first front string data is equal to an integer multiple of a preset step; obtains M pieces of to-be-reported data based on a plurality of pieces of privacy data, the N pieces of first front string data, and rear string data of different lengths; and determines reporting rates of the M pieces of to-be-reported data based on the plurality of pieces of privacy data, and determines to-be-reported data whose reporting rate is greater than a first preset value as target to-be-reported data.

Beneficial effects include: The server matches the privacy data sent by the terminal devices with the to-be-reported data in two directions, namely, a head direction and a tail direction. In this way, matching accuracy and a matching speed are high.

Optionally, that a server obtains M pieces of to-be-reported data based on a plurality of pieces of privacy data, the N pieces of first front string data, and rear string data of different lengths may be implemented in the following manner. The server first determines a reporting rate of each piece of first front string data based on the plurality of pieces of privacy data, and then uses first front string data whose reporting rate is greater than a second preset value as second front string data, to obtain P pieces of second front string data in total. In this case, the server may form the M pieces of to-be-reported data by using all the second front string data and the rear string data of different lengths.

Optionally, in this embodiment, data matching efficiency can be improved by gradually increasing a length of front string data. In an exemplary embodiment, if determining that a length of the obtained second front string data is less than a preset length value, the server determines H pieces of third front string data from the P pieces of second front string data based on a reporting rate of each piece of second front string data and a reporting rate of to-be-reported data corresponding to the second front string data; and then separately adds different data with the preset step to a tail part of each of the H pieces of third front string data to obtain N pieces of fourth front string data, updates the N pieces of fourth front string data to the N pieces of first front string data, and continues to perform the foregoing matching process.

Beneficial effects include: The server performs matching on the to-be-reported data in the two directions, namely, the head direction and the tail direction. In this way, the to-be-reported data can be quickly found. In addition, during matching, matching is performed in a manner of gradually increasing a length of front string data, thereby improving processing efficiency.

Optionally, the privacy data may further include a length of front string data, a length of rear string data, scrambled front string data, scrambled rear string data, and hash functions corresponding to the scrambled front string data and the scrambled rear string data. In this case, the determining a reporting rate of each piece of first front string data based on the plurality of pieces of privacy data may be implemented in the following manner.

The server first obtains, from Q1 pieces of privacy data of the plurality of pieces of privacy data based on the length of the first front string data, Q1 pieces of scrambled front string data and hash functions corresponding to the Q1 pieces of scrambled front string data, where lengths of front string data in the Q1 pieces of privacy data are equal to the length of the first front string data; then determines a second matrix based on the Q1 pieces of scrambled front string data and the hash functions corresponding to the Q1 pieces of scrambled front string data, where a quantity of rows of the second matrix is equal to a quantity Q2 of different hash functions in the Q1 hash functions, and the rows are in a one-to-one correspondence with the Q2 hash functions; determines, for each piece of first front string data, Q2 hash values of the first front string data based on the Q2 different hash functions, and determines Q2 noise addition rates based on the Q2 hash values and the second matrix; and finally determines the reporting rate of the first front string data based on the Q2 noise addition rates.

The determining Q2 noise addition rates based on the Q2 hash values and the second matrix may be implemented in the following manner: first obtaining, for each hash value and from the second matrix, elements in a row corresponding to a hash function related to the hash value k3, and obtaining the $(k3)^{th}$ element from the elements in the row, where the hash function related to the hash value k3 is a hash function that is used to obtain the hash value k3 based on the first front string data; obtaining, from the Q1 pieces of scrambled front string data, a quantity Q3 of pieces of scrambled front string data corresponding to the hash function related to the hash value k3; and then determining, based on the element and Q3, a noise addition rate corresponding to the hash value k3, to accurately obtain the Q2 noise addition rates of the first front string data.

An exemplary manner in which the server determines the reporting rate of the first front string data based on the Q2 noise addition rates may be: The server determines the reporting rate of the first front string data based on the Q2 noise addition rates and a first noise amplitude. For example, the server determines a difference between each of the Q2 noise addition rates and the first noise amplitude, and uses a minimum value of ratios between Q2 differences and a second noise amplitude as the reporting rate of the first front string data, where the second noise amplitude is a difference between a constant and twice the first noise amplitude.

Optionally, that the server determines a second matrix may be implemented in the following manner: first determining Q2 groups of scrambled front string data from the Q1 pieces of scrambled front string data, where each group of scrambled front string data is corresponding to a same hash function; then adding up data in each group of the Q2 groups of scrambled front string data based on corresponding bits to obtain Q2 row vectors in total; and forming the second matrix by using the Q2 row vectors.

Beneficial effects include: The second matrix established according to the foregoing method is correlated with front string data in reported data from the terminal devices. Therefore, search accuracy can be improved by searching for the reported data from the terminal devices based on the second matrix.

Optionally, that a server determines reporting rates of the M pieces of to-be-reported data based on the plurality of pieces of privacy data may be implemented in the following manner. The server first determines Q4 groups of to-be-reported data from the M pieces of to-be-reported data, where in each group of to-be-reported data, lengths of front string data are the same, and lengths of rear string data are the same; obtains, for each group of to-be-reported data and from Q5 pieces of second privacy data of the plurality of pieces of privacy data based on the lengths of the front string data and the rear string data in the group of to-be-reported data, Q5 pieces of scrambled rear string data and hash functions corresponding to the Q5 pieces of scrambled rear string data, where lengths of front string data in the Q5 pieces of second privacy data are equal to the length of the front string data in the group of to-be-reported data, and lengths of rear string data in the Q5 pieces of second privacy data are equal to the length of the rear string data in the group of to-be-reported data; determines a fourth matrix based on the Q5 pieces of scrambled rear string data and the hash functions corresponding to the Q5 pieces of scrambled rear string data, where a quantity of rows of the fourth matrix is equal to a quantity Q6 of different hash functions in the Q5 hash functions, and the rows are in a one-to-one correspondence with the Q6 hash functions; then determines, for each piece of to-be-reported data in the group of to-be-reported data, Q6 hash values of the to-be-reported data based on the Q6 different hash functions, and determines Q6 noise addition rates based on the Q6 hash values and the fourth matrix; and finally determines a reporting rate of the to-be-reported data based on the Q6 noise addition rates.

Beneficial effects include: In the foregoing method, the reporting rates of the to-be-reported data are determined based on the privacy data reported by the terminal devices, so that the reporting rates of the to-be-reported data are related to the privacy data reported by the terminal devices. In this way, by searching for reported data from the terminal devices based on these pieces of to-be-reported data, accuracy of searching for the reported data can be improved.

That the server determines Q6 noise addition rates based on the Q6 hash values and the fourth matrix may be implemented in the following manner. The server first obtains, for each hash value and from the fourth matrix, elements in a row corresponding to a hash function related to the hash value k4, and obtains the $(k4)^{th}$ element from the elements in the row, where the hash function related to the hash value k4 is a hash function that is used to obtain the hash value k4 based on the to-be-reported data; obtains, from the Q5 pieces of scrambled rear string data, a quantity Q7 of pieces of scrambled rear string data corresponding to the hash function related to the hash value k4; and then determines, based on the element and Q7, a noise addition rate corresponding to the hash value k4.

That the server determines a reporting rate of the to-be-reported data based on the Q6 noise addition rates may be: The server determines the reporting rate of the to-be-reported data based on the Q6 noise addition rates and a first noise amplitude. For example, the server determines a difference between each of the Q6 noise addition rates and the first noise amplitude, and uses a minimum value of ratios between Q6 differences and a second noise amplitude as the reporting rate of the to-be-reported data, where the second noise amplitude is a difference between a constant and twice the first noise amplitude.

Optionally, that the server determines a fourth matrix may be implemented in the following manner: first determining Q6 groups of scrambled rear string data from the Q5 pieces of scrambled rear string data, where each group of scrambled rear string data is corresponding to a same hash function; then adding up data in each group of the Q6 groups of scrambled rear string data based on corresponding bits to obtain Q6 row vectors in total; and finally forming the fourth matrix by using the Q6 row vectors.

Beneficial effects include: The fourth matrix established according to the foregoing method is correlated with rear string data in reported data from the terminal devices. Therefore, search accuracy can be improved by searching for the reported data from the terminal devices based on the fourth matrix.

Optionally, that the server determines H pieces of third front string data from the P pieces of second front string data based on a reporting rate of each piece of second front string data and a reporting rate of to-be-reported data corresponding to the second front string data may be implemented in the following manner: first determining a remaining reporting rate of each piece of second front string data based on the reporting rate of the second front string data and reporting rates of all to-be-reported data corresponding to the second front string data; and determining second front string data whose remaining reporting rate is greater than or equal to a third preset value as third front string data, to obtain the H pieces of third front string data. In this way, screening of front string data can be implemented to reserve front string data that satisfies a requirement, to perform subsequent matching, thereby reducing an amount of data used for matching, and improving matching efficiency.

The determining a remaining reporting rate of second front string data may be implemented in the following manner. The server first obtains, for each piece of second front string data, a sum of the reporting rates of all the to-be-reported data corresponding to the second front string data; and determines, as a remaining reporting rate of the second front string data, a difference between a reporting rate of the second front string data and the sum.

Optionally, the length of the rear string data is less than or equal to the preset step.

According to a third aspect, an embodiment provides a privacy data reporting apparatus, including:

an obtaining module, configured to obtain to-be-reported data;

a division module, configured to divide the to-be-reported data into front string data and rear string data based on a preset step, where a length of the front string data is an integer multiple of the preset step, and the rear string data is data in the to-be-reported data other than the front string data;

a scrambling module, configured to separately scramble the front string data and the rear string data according to a preset scrambling algorithm, to generate privacy data; and a sending module, configured to send the privacy data to a server.

According to a fourth aspect, an embodiment provides a privacy data reporting apparatus, including:

a receiving module, configured to receive privacy data sent by a plurality of terminal devices;

a front-string-data determining module, configured to determine N pieces of first front string data, where a length of the first front string data is equal to an integer multiple of a preset step, and N is a positive integer;

a to-be-reported data obtaining module, configured to obtain M pieces of to-be-reported data based on a plurality of pieces of privacy data, the N pieces of first front string data, and rear string data of different lengths; and a reporting rate determining module, configured to: determine reporting rates of the M pieces of to-be-reported data based on the plurality of pieces of privacy data, and determine to-be-reported data whose reporting rate is greater than a first preset value as target to-be-reported data.

According to a fifth aspect, an embodiment provides a terminal device, including:

a memory, configured to store a computer program;

a processor, configured to execute the computer program to implement the privacy data reporting method according to any one of the first aspect or the implementations of the first aspect; and a sender, configured to send privacy data generated by the processor to a server.

According to a sixth aspect, an embodiment provides a server, including:

a receiver, configured to receive to-be-reported data sent by a terminal device;

a memory, configured to store a computer program; and a processor, configured to execute the computer program to implement the privacy data reporting method according to any one of the second aspect or the implementations of the second aspect.

According to a seventh aspect, an embodiment provides a computer storage medium. The storage medium stores a computer program. When the computer program is executed, the privacy data reporting method according to any one of the first aspect, the second aspect, or the implementations of the first aspect and the second aspect is implemented.

According to the privacy data reporting method and apparatus, and the storage medium that are provided in the embodiments, the terminal device obtains the to-be-reported data; divides the to-be-reported data into the front string data and the rear string data based on the preset step, where the length of the front string data is an integer multiple of the preset step, and the rear string data is the data in the to-be-reported data other than the front string data; and separately scrambles the front string data and the rear string data to generate the privacy data, and sends the privacy data to the server. The server receives the privacy data sent by the plurality of terminal devices; determines the N pieces of first front string data, where the length of the first front string data is equal to an integer multiple of the preset step; obtains the M pieces of to-be-reported data based on the plurality of pieces of privacy data, the N pieces of first front string data, and the rear string data of different lengths; and finally determines the reporting rates of the M pieces of to-be-reported data based on the plurality of pieces of privacy data, and determines the to-be-reported data whose reporting rate is greater than the first preset value as the target to-be-reported data. In other words, according to the method in the embodiments, the terminal device divides the to-be-reported data into two parts, and separately scrambles the two parts to generate the privacy data; and the server matches the privacy data sent by the terminal device with the to-be-reported data in the two directions, namely, the head direction and the tail direction. In this way, matching accuracy and a matching speed are high.

DESCRIPTION OF EMBODIMENTS

Figure 1A:
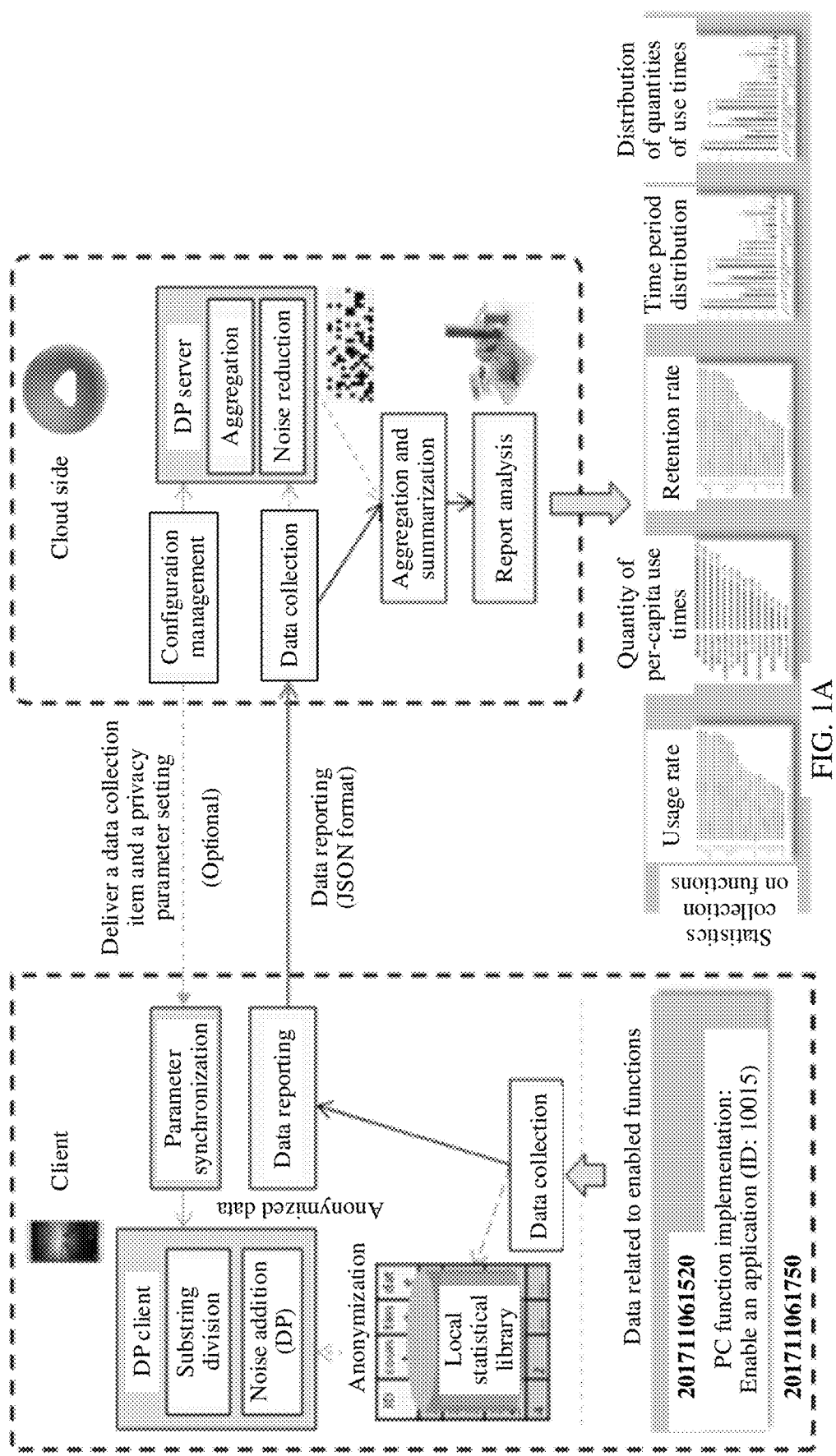
FIG. 1A is an application scenario diagram of a privacy data reporting method according to an embodiment.

To improve user experience, it is necessary to collect user data for intelligent analysis. For example, more than XX pieces of user data are collected by using a Huawei mobile phone for analysis to improve user experience. However, a privacy issue is still under heated discussion. For example, during collection of a topic that a user is concerned about and interested in or an application installed by the user, sensitive information of the user such as a state of illness and a religious belief may be known. To prevent leakage of user privacy, a differential privacy technology may be used to protect user behavior data on which statistics collection needs to be performed.

During statistics collection for a sensitive event, both a client and a server need to know in advance a name of the sensitive event for which statistics collection needs to be performed. For example, if an installation rate of software "vmall.com" needs to be calculated through statistics collection, both the client and the server know in advance that statistics collection needs to be performed on a keyword "vmall.com". However, for a small amount of software installed on the client, the server does not know names of the software in advance. In addition, to protect user privacy, the client is not allowed to directly upload the names of the software by using a plaintext.

In an existing privacy data reporting method, before reporting data to a server, a client divides the to-be-reported data into character strings of an equal length. When the to-be-reported data is not an integer multiple of a division step, for example, the to-be-reported data is "sun", and the division step is two characters, the data "sun" is divided into character strings "su" and "n". For "n", the server still attempts to perform matching on "n" according to 26×26 (26 is a quantity of English letters) letter combinations. In this case, matching accuracy of the server is low, and consequently a matching failure may occur.

In addition, in an existing technology, during data matching, the server obtains an association relationship between different letter combinations by calculating conditional probabilities between the different letter combinations. However, during calculation of a conditional probability of a scrambled letter combination reported by each user, performance overheads are relatively high and a search speed is low.

To resolve the foregoing technical problem, in technical solutions provided in the embodiments, a terminal device divides to-be-reported data into two complementary parts that do not overlap (that is, front string data and rear string data), separately scrambles the two parts, and then sends two scrambled parts to a server. The scrambled front string data is correlated with the scrambled rear string data. In this way, during matching, the server does not need to calculate an adjustment probability, and a matching process of the server is simple and matching accuracy is high. In addition, the server performs data matching in two directions, namely, a head direction and a tail direction. In this way, the reported data sent by the terminal device can be quickly found, thereby improving data search efficiency.

FIG. 1A is an application scenario diagram of a privacy data reporting method according to an embodiment. As shown in FIG. 1A, communication connection is performed between a terminal device and a server in this embodiment. The terminal device obtains to-be-reported data (for example, data related to enabled functions in the figure). Optionally, the terminal device stores the to-be-reported data in a local database. Then, a DP (Differential Privacy, where differential privacy means that: Random noise is added to information reported by a client, so that the server side cannot associate the information reported by the client with the client) client of the client of the terminal device performs substring division on the to-be-reported data to obtain front string data and rear string data. Then, the front string data and the rear string data are separately scrambled, and privacy data generated after the scrambling is reported to the server.

The server performs aggregation and noise reduction processing on the privacy data to obtain data reported by the terminal device, and aggregates and summarizes the reported data to generate various reports, for example, information such as a software usage rate, a quantity of per-capita use times, a retention rate, time period distribution, and distribution of quantities of use times.

Exemplary embodiments are used below to describe in detail the technical solutions. The following several exemplary embodiments may be combined with each other, and a same or similar concept or process may not be described repeatedly in some embodiments.

Figure 1B:
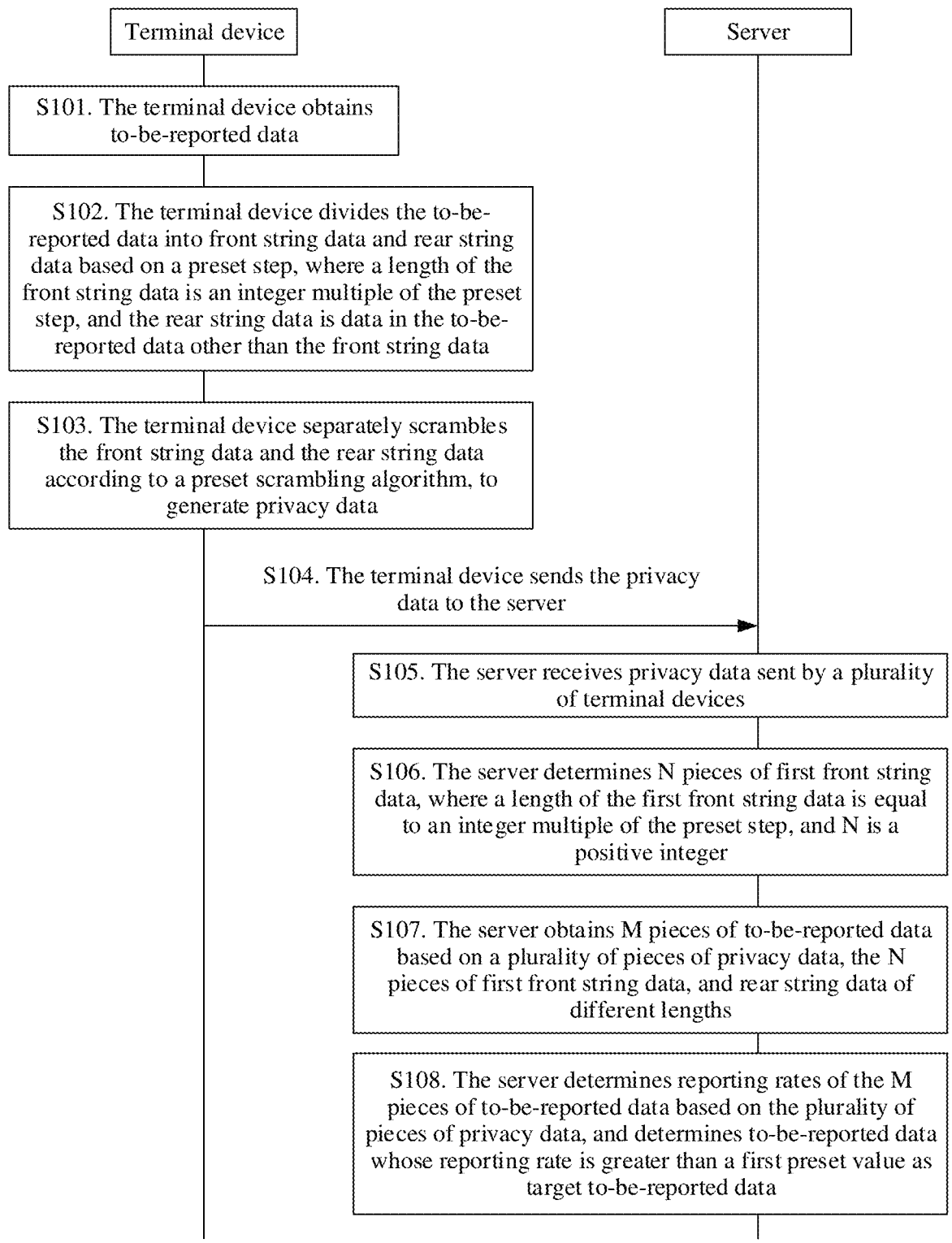
FIG. 1B is a flowchart of a privacy data reporting method according to Embodiment 1.

FIG. 1B is a flowchart of a privacy data reporting method according to Embodiment 1. As shown in FIG. 1B, the method in this embodiment may include the following steps.

In step S101, a terminal device obtains to-be-reported data.

The terminal device in this embodiment is also referred to as user equipment, a mobile station, a mobile terminal, or the like, and is a device that provides voice/data connectivity for a user, for example, a handheld device or a vehicle-mounted device with a wireless connection function. Currently, some examples of the terminal device include a mobile phone, a tablet computer, a notebook computer, a palmtop computer, a mobile Internet device, a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal device in a smart home, and the like.

In this embodiment, steps performed on the terminal device side are implemented by a client in the terminal device, and the client is a software module in the terminal device, for example, a client such as WeChat or Application Market. This embodiment is described by using an example in which an execution body is the terminal device.

The terminal device in this embodiment uses, based on a user experience plan or another AI (artificial intelligence) service, data stored in the terminal device as the to-be-reported data, or obtains the to-be-reported data from another device.

In this embodiment, the terminal device may obtain the to-be-reported data according to a preset reporting rule, where the preset reporting rule may be obtained by the terminal device through pre-matching. For example, at delivery of a Huawei mobile phone, the following may be set: Names of software installed on the terminal device are reported once every other week. In this way, the terminal device reports, to a server every other week, the software names of all the software installed on the terminal device as to-be-reported data.

Optionally, the terminal device may report data when receiving a reporting request. For example, the terminal device receives a reporting request sent by a server, where the reporting request carries information about data that needs to be reported; and the terminal device obtains the data corresponding to the data information indicated in the reporting request, as to-be-report data.

The to-be-reported data in this embodiment may be any character, for example, a digit, a letter, a punctuation mark, or another non-printable character. A Chinese character may be reported based on a binary code of the Chinese character.

To improve effectiveness of the to-be-reported data, after obtaining the to-be-reported data, the terminal device preprocesses the to-be-reported data, for example, filters out data with an excessively long character string or deletes unqualified data. A processing procedure is as follows: The terminal device calls an API (application programming interface) of a differential privacy algorithm, and specifies a data preprocessing method, a parameter, and the like.

As shown in FIG. 1A, an initialized privacy parameter in the terminal device in this embodiment may be preconfigured by the terminal device, or may be delivered by the server.

The privacy parameter includes a differential privacy algorithm and a parameter. An exemplary processing procedure is as follows: When processing a differential privacy event, the terminal device inputs the to-be-used differential privacy algorithm and parameter. Then, the terminal device initializes a DP instance according to the differential privacy algorithm, and stores the differential privacy algorithm and the parameter.

In step S102, the terminal device divides the to-be-reported data into front string data and rear string data based on a preset step, where a length of the front string data is an integer multiple of the preset step, and the rear string data is data in the to-be-reported data other than the front string data.

In this step, based on the preset step, the terminal device divides the to-be-reported data into two parts: the front string data and the rear string data. For example, a preset step is 2, and to-be-reported data "sun" is divided into front string data "su" and rear string data "n" based on the preset step 2.

For example, if a length of the data is 7 and the step is 2, there are three manners of obtaining the front string data and the rear string data through division:

A length of a front string is 2 and a length of a rear string is 5.

The length of the front string is 4 and the length of the rear string is 3.

The length of the front string is 6 and the length of the rear string is 1.

The length of the front string data is an integer multiple of the preset step. In this case, in a subsequent matching process of the front string data, the server can increase a search length of the front string data by using the step as a unit, thereby improving search efficiency. A length of the rear string data is the data in the to-be-reported data other than the front string data, and the rear string data is not empty. In this case, the front string data and the rear string data form two complementary parts that do not overlap. Therefore, in a matching process of rear string data, the server can implement matching of rear string data of different lengths, without performing matching by using a step as a matching unit. This improves matching accuracy of the rear string data.

In addition, in this embodiment, the to-be-reported data is divided into two parts, a division process is simple, and a scrambling workload is small; and when the server performs matching subsequently, a quantity of matching times is small. Therefore, data matching efficiency is improved.

In this embodiment, the two to-be-reported parts are correlated with each other, and conditional probabilities between different character strings do not need to be calculated, thereby simplifying a matching process and improving a matching effect.

In this embodiment, a setting of the preset step is determined depending on an actual requirement. For example, if a relatively high accuracy requirement is imposed, the step should be a relatively large value. In this case, there are fewer substring division manners, and each type of substring accounts for a relatively high proportion, thereby ensuring accuracy. If a system is relatively sensitive to running load, the step may be set to a relatively small value. In this case, search space of each type of substring is relatively small, and running overheads are relatively low.

Optionally, step=min(ln(expected CPU usage×100), ln(1.0/expected precision)).

In step S103, the terminal device separately scrambles the front string data and the rear string data according to a preset scrambling algorithm, to generate privacy data.

In this step, the terminal device separately scrambles the foregoing generated front string data and rear string data to generate scrambled front string data corresponding to the front string data and scrambled rear string data corresponding to the rear string data, and adds the scrambled front string data and the scrambled rear string data in this case to a piece of privacy data.

For example, the front string data is "su", and the preset scrambling algorithm is a local differential privacy algorithm. The terminal device first calculates a hash value of the front string data, and sets a bloomfiler (for example, a vector with a length of 512 bits). Then, the terminal device flips each bit "1" in the bloomfilter to a bit "0" based on a preset scrambling rate f, and flips each bit "0" in the bloomfilter to "1" based on the scrambling rate f, to generate scrambled front string data of the front string data "su". Similarly, the terminal device may generate scrambled rear string data of the rear string data "n".

Optionally, the preset scrambling algorithm may be configured by the terminal device, for example, set when the terminal device is at delivery. Optionally, the preset scrambling algorithm may be obtained by the terminal device from a network side, for example, delivered by the server. Optionally, the preset scrambling algorithm may be obtained by the terminal device in another manner. A manner of obtaining the preset scrambling algorithm is not limited in this embodiment.

In this embodiment, one piece of to-be-reported data is corresponding to one piece of privacy data.

Optionally, the privacy data may further include the preset step and the like.

In step S104, the terminal device sends the privacy data to the server.

After generating, according to the foregoing steps, the privacy data corresponding to the to-be-reported data, the terminal device sends the privacy data to the server, for example, sends the generated privacy data to the server through a Hiview channel.

In step S105, the server receives privacy data sent by a plurality of terminal devices.

The server in this embodiment may be a local server, or may be a cloud server.

Communication connection is performed between the server and the plurality of terminal devices, and the server may receive the privacy data sent by the plurality of terminal devices.

Optionally, after receiving the privacy data sent by the plurality of terminal devices, the server sorts the privacy data, and invokes a mask algorithm and the like to perform mask processing on personal data (for example, an IP address) in the privacy data, to ensure that the data is anonymized.

Optionally, the privacy data may be sorted and summarized based on dimensions such as models and versions of the terminal devices and IDs and statistics collection periods of the privacy data, to facilitate subsequent data search.

In step S106, the server determines N pieces of first front string data, where a length of the first front string data is equal to an integer multiple of the preset step, and N is a positive integer.

In this step, the server determines N different pieces of first front string data based on the preset step, where a length of each piece of first front string data is equal to an integer multiple of the preset step. For example, if the preset step is 2, the server may determine that the N pieces of first front string data are respectively aa, ab, . . . , and zz, or the server may determine that the N pieces of first front string data are respectively aaaa, aaab, . . . , and zzzz.

Optionally, assuming that the step is 2, when the first front string data includes two letters, N may be 26×26; when the first front string data includes one letter and one piece of data, N may be 26×10; and when the first front string data includes two numbers, N may be 10×10. Optionally, when the first front string data includes three letters, N may be 26×26×26; when the first front string data includes two letters and one piece of data, N may be 26×26×10; when the first front string data includes one letter and two numbers, N may be 26×10×10; and when the first front string data includes three digits, N may be 10×10×10. According to the foregoing method, a maximum value of N may be determined based on a composition form of the first front string data, to improve matching accuracy of the first front string data.

In step S107, the server obtains M pieces of to-be-reported data based on a plurality of pieces of privacy data, the N pieces of first front string data, and rear string data of different lengths.

M is an integer greater than N.

In this embodiment, the N different pieces of first front string data and the rear string data of different lengths form different data.

For example, when first front string data aa is combined with rear string data whose length is 1, generated data may be aaa, aab, aac, . . . , and aaz; and when the first front string data aa is combined with rear string data whose length is 2, generated data may be aaaa, aaab, aaac, . . . , and aazz.

Optionally, to improve matching efficiency of rear string data, a length of the rear string data is less than or equal to the preset step.

After obtaining data formed by the N pieces of first front string data and the rear string data of different lengths, the server obtains M pieces of data from the foregoing formed data based on the plurality of pieces of privacy data, as to-be-reported data. For example, reporting rates of the first front string data are determined based on the plurality of pieces of privacy data, and data corresponding to each piece of first front string data whose reporting rate is greater than a preset value is used as to-be-reported data. In this way, a quantity of pieces of to-be-reported data to be processed is reduced, and a matching speed of the to-be-reported data is increased.

Optionally, the plurality of pieces of privacy data are privacy data that is related to the first front string data and that is in the privacy data reported by the plurality of terminal devices. For example, lengths of front string data included in the plurality of pieces of privacy data are equal to a length of the first front string data. In this case, the M pieces of to-be-reported data are determined based on the privacy data, thereby ensuring a correlation between the to-be-reported data and reported data, and further improving data matching accuracy.

In step S108, the server determines reporting rates of the M pieces of to-be-reported data based on the plurality of pieces of privacy data, and determines to-be-reported data whose reporting rate is greater than a first preset value as target to-be-reported data.

In this step, screening is performed again on the M pieces of to-be-reported data determined according to the foregoing steps, to select to-be-reported data that satisfies a requirement as the target to-be-reported data.

One piece of to-be-reported data is used as an example. Lengths of first front string data a and rear string data b of the to-be-reported data are obtained, and privacy data c including front string data whose length is b and rear string data whose length is a is obtained from the privacy data reported by the plurality of terminals. A reporting rate of the to-be-reported data is determined based on the privacy data c. If the reporting rate of the to-be-reported data is greater than the first preset value, the to-be-reported data is determined as target to-be-reported data, or in other words, it may be determined that a terminal device reports the to-be-reported data. According to the foregoing method, the target to-be-reported data is selected from the M pieces of to-be-reported data.

According to the method in this embodiment, the server first determines the first front string data, and then forms the to-be-reported data by using the first front string data and the rear string data of different lengths, and performs screening on the to-be-reported data to obtain the target to-be-reported data. In other words, in this embodiment, matching is performed on the to-be-reported data in two directions, namely, a head direction and a tail direction. In this way, a matching speed of the to-be-reported data is increased.

According to the privacy data reporting method in this embodiment, the terminal device obtains the to-be-reported data, and divides the to-be-reported data into the front string data and the rear string data based on the preset step, where the length of the front string data is an integer multiple of the preset step, and the rear string data is the data in the to-be-reported data other than the front string data; then separately scrambles the front string data and the rear string data to generate the privacy data; and sends the privacy data to the server. The server receives the privacy data sent by the plurality of terminal devices, and determines the N pieces of first front string data, where the length of the first front string data is equal to an integer multiple of the preset step; then obtains the M pieces of to-be-reported data based on the plurality of pieces of privacy data, the N pieces of first front string data, and the rear string data of different lengths; and finally determines the reporting rates of the M pieces of to-be-reported data based on the plurality of pieces of privacy data, and determines the to-be-reported data whose reporting rate is greater than the first preset value as the target to-be-reported data. In other words, according to the method in this embodiment, the terminal device divides the to-be-reported data into two parts, and separately scrambles the two parts to generate the privacy data; and the server matches the privacy data sent by the terminal device with the to-be-reported data in the two directions, namely, the head direction and the tail direction. In this way, matching accuracy and a matching speed are high.

Figure 2:
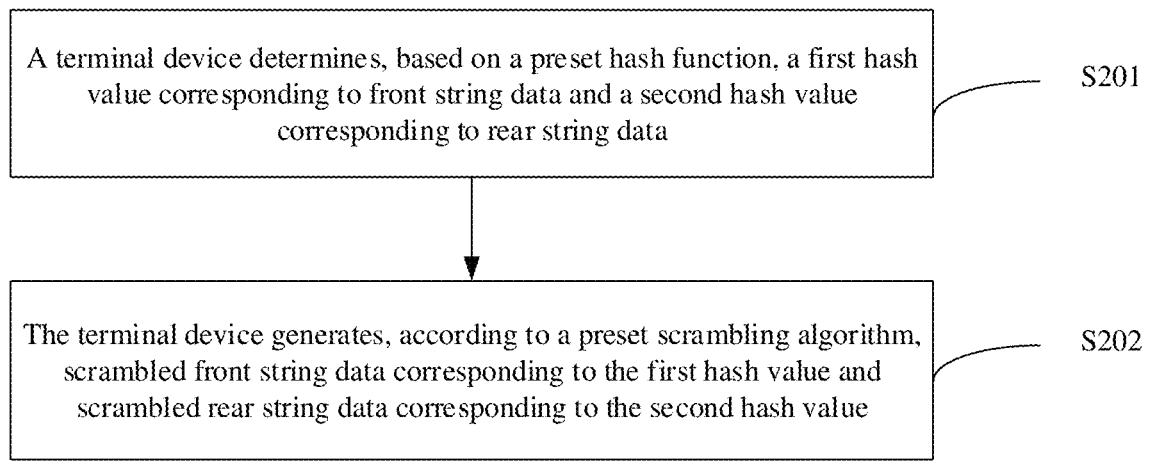
FIG. 2 is a flowchart of a privacy data reporting method according to Embodiment 2.

FIG. 2 is a flowchart of a privacy data reporting method according to Embodiment 2. Based on the foregoing embodiment, the privacy data in this embodiment includes scrambled front string data and scrambled rear string data, and an exemplary process in which the terminal device separately scrambles the front string data and the rear string data according to the preset scrambling algorithm, to generate the privacy data is as follows. As shown in FIG. 2, step S103 may include the following steps.

In step S201, the terminal device determines, based on a preset hash function, a first hash value corresponding to the front string data and a second hash value corresponding to the rear string data.

The preset hash function in this embodiment may be preconfigured in the terminal device, or may be obtained by the terminal device from the server side.

In actual application, the terminal device determines, based on a preset hash function, a hash value corresponding to the front string data, marks the hash value as the first hash value, and determines, based on a preset hash function, a hash value corresponding to the rear string data.

Optionally, in this embodiment, the hash function used for the front string data may be the same as or different from the hash function used for the rear string data. This is specifically determined depending on an actual requirement.

Optionally, there are a plurality of preset hash functions, and the terminal device randomly selects a hash function from the plurality of preset hash functions to calculate the hash value of the front string data. Similarly, the terminal device randomly selects a hash function from the plurality of preset hash functions to calculate the hash value of the rear string data.

In a possible implementation of this embodiment, step S201 may include the following steps.

In step S201a, the terminal device determines the first hash value of the front string data based on the preset hash function.

In step S201b, the terminal device determines, based on the preset hash function, a second hash value of data formed by the first hash value and the rear string data.

In an exemplary embodiment, the terminal device randomly selects a hash function hk from the hash functions to calculate the first hash value hk1 and the second hash value hk2.

For example, the first hash value hk1 and the second hash value hk2 are calculated according to the following formula:

$$hk1=hk(p1); \text{ and}$$

$$hk2=hk(p2\|hk1).$$

Alternatively, the first hash value hk1 and the second hash value hk2 are calculated according to the following formula:

$$hk1=hk(H(p1)); \text{ and}$$

$$hk2=hk(p2\|H(p1)).$$

H may be an SHA digest algorithm, an MD5 digest algorithm, or the like.

hk is a hash function related to a hash function index k, and may be the following operation: H("k"∥string) % m.

In this embodiment, the hash value of the data formed by the first hash value and the rear string data is used as the second hash value corresponding to the rear string data, to associate the front string data with the rear string data. In this way, when performing data matching, the server does not need to calculate a conditional probability of each piece of privacy data. This simplifies a matching process and reduces matching complexity.

In step S202, the terminal device generates, according to the preset scrambling algorithm, scrambled front string data corresponding to the first hash value and scrambled rear string data corresponding to the second hash value.

For example, after obtaining, according to the foregoing steps, the first hash value corresponding to the front string data and the second hash value corresponding to the rear string data, according to the preset scrambling algorithm, the terminal device scrambles the first hash value corresponding to the front string data, to generate the scrambled front string data, and scrambles the second hash value corresponding to the rear string data, to generate the scrambled rear string data.

For example, the preset scrambling algorithm is a local differential privacy algorithm, the first hash value corresponding to the front string data is 45, and an initial bloomfiler vector is set. For example, the initial bloomfiler vector is a vector that includes elements 0 and 1 and whose length is 512 bits. First, the $45^{th}$ bit bit in the bloomfiler vector is set to 1 or flipped. Then, each bit "1" in the bloomfilter vector is flipped to a bit "0" according to a preset probability q1, and each bit "0" in the bloomfilter vector is flipped to "1" according to a preset probability q2, to generate scrambled front string data corresponding to the first hash value 45. Scrambled rear string data corresponding to the second hash value may be generated similarly.

Optionally, in this embodiment, another scrambling algorithm may be used to generate the scrambled front string data corresponding to the first hash value and the scrambled rear string data corresponding to the second hash value. This is not limited in this embodiment.

The terminal device uses the obtained scrambled front string data and scrambled rear string data as the privacy data corresponding to the to-be-reported data, and sends the privacy data to the server, to implement reporting of the privacy data.

Optionally, the privacy data in this embodiment further includes the preset hash functions, that is, the hash function used to generate the first hash value corresponding to the front string data and the hash function used to generate the second hash value corresponding to the rear string data.

Optionally, the privacy data in this embodiment may further include the length of the front string data and a length of the rear string data, so that when the server determines a candidate data set based on the length of the front string data and the length of the rear string data, blindness is reduced, and accuracy of selecting the candidate data set is improved, thereby further increasing a data matching speed and improving data matching accuracy.

According to the privacy data reporting method provided in this embodiment, the first hash value corresponding to the front string data and the second hash value corresponding to the rear string data are determined based on the preset hash function, and the scrambled front string data corresponding to the first hash value and the scrambled rear string data corresponding to the second hash value are generated according to the preset scrambling algorithm, so as to implement association between the front string data and the rear string data. In this way, when performing data matching, the server does not need to calculate a conditional probability of each piece of privacy data. This simplifies a matching process and reduces matching complexity.

Figure 3:
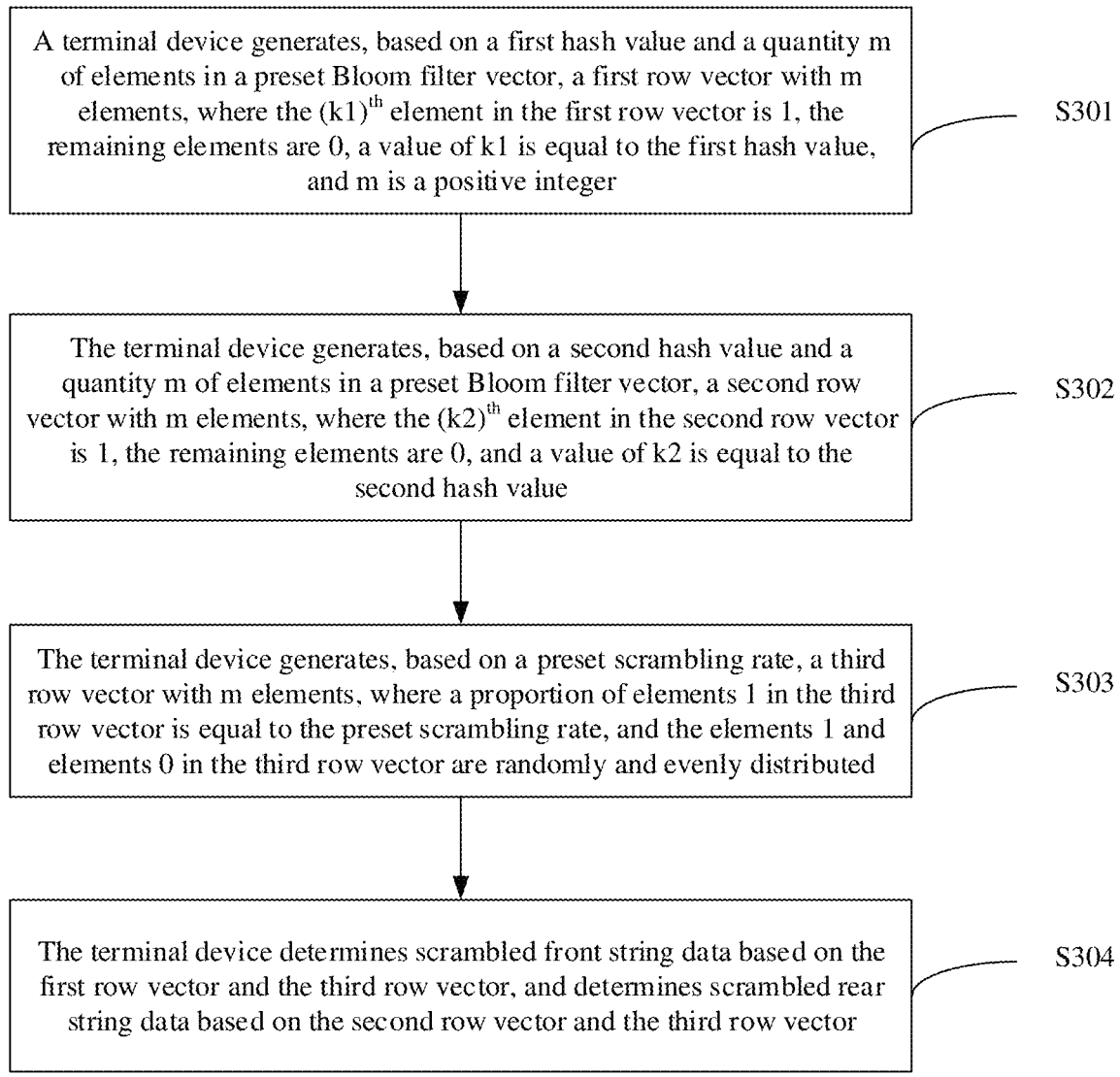
FIG. 3 is a flowchart of a privacy data reporting method according to Embodiment 3.

FIG. 3 is a flowchart of a privacy data reporting method according to Embodiment 3. Based on the foregoing embodiments, this embodiment relates to the following process: If the preset scrambling algorithm is a Bloom filter method, the terminal device generates, according to the preset scrambling algorithm, the scrambled front string data corresponding to the first hash value and the scrambled rear string data corresponding to the second hash value. As shown in FIG. 3, step S201 may include the following steps.

In step S301, the terminal device generates, based on the first hash value and a quantity m of elements in a preset Bloom filter vector, a first row vector with m elements, where the $(k1)^{th}$ element in the first row vector is 1, a remaining portion of elements are 0, a value of k1 is equal to the first hash value, and m is a positive integer.

In step S302, the terminal device generates, based on the second hash value and a quantity m of elements in a preset Bloom filter vector, a second row vector with m elements, where the $(k2)^{th}$ element in the second row vector is 1, a remaining portion of elements are 0, and a value of k2 is equal to the second hash value.

In step S303, the terminal device generates, based on a preset scrambling rate, a third row vector with m elements, where a proportion of elements 1 in the third row vector is equal to the preset scrambling rate, and the elements 1 and elements 0 in the third row vector are randomly and evenly distributed.

In step S304, the terminal device determines the scrambled front string data based on the first row vector and the third row vector, and determines the scrambled rear string data based on the second row vector and the third row vector.

The preset scrambling algorithm used by the terminal device in this embodiment is the Bloom filter method. Before performing scrambling, the terminal device first performs parameter initialization. For example, the terminal device determines the quantity m of elements in the preset Bloom filter vector (that is, a Bloom filter vector) and a preset scrambling rate f. m and f may be configured by the terminal device, or may be delivered by the server, where m is greater than or equal to the larger of the first hash value and the second hash value.

Optionally, the scrambling rate f may be obtained directly, or may be determined indirectly according to the following formula:

$$f=1/(1+\exp(\varepsilon/4))$$

ε is a preset differential privacy budget. In an exemplary embodiment, the terminal device directly obtains ε, and then calculates the scrambling rate f based on ε, where ε may be configured by the terminal device, or may be delivered by the server.

After parameter initialization is completed, the first row vector corresponding to the foregoing generated front string data is generated based on the quantity m of elements in the preset Bloom filter vector and a first hash function that is generated based on the front string data, and the second row vector corresponding to the foregoing generated rear string data is generated based on the quantity m of elements in the preset Bloom filter vector and a second hash function that is generated based on the rear string data.

In an exemplary embodiment, a zero vector X0 with m elements is generated, that is, all elements in the vector X0 are 0. Then, the $(k1)^{th}$ element in the vector X0 is flipped from 0 to 1 to generate a first row vector X1, where a value of k1 is equal to a first hash value. For example, if the first hash value is 4, the fourth element in the vector X0 is flipped to 1 to generate a first row vector X1=[0, 0, 0, 1, ..., 0].

Similarly, the $(k2)^{th}$ element in the vector X0 is flipped from 0 to 1 to generate a second row vector X2, where the value of k2 is equal to a second hash value. For example, if the second hash value is 3, the third element in the vector X0 is flipped to 1 to generate a second row vector X2=[0, 0, 1, 0, ..., 0].

Then, a third row vector G1 with m elements and that includes only elements 1 and elements 0 is generated based on the preset scrambling rate f, where a proportion of the elements 1 in the third row vector G1 is equal to the preset scrambling rate f, and the elements 1 and the elements 0 in the third row vector G1 are randomly and evenly distributed.

Then, scrambled front string data V1 is determined based on the first row vector X1 and the third row vector G1, and scrambled rear string data V2 is determined based on the second row vector X2 and the third row vector G1. For example, a vector generated after the first row vector X1 is added to the third row vector G1 or the third row vector G1 is subtracted from the first row vector X1 is used as the scrambled front string data V1; and a vector generated after the second row vector X2 is added to the third row vector G1 or the third row vector G1 is subtracted from the second row vector X2 is used as the scrambled rear string data V2.

In an example, step S304 may alternatively include: The terminal device performs an exclusive OR operation on the first row vector X1 and the third row vector G1 to generate the scrambled front string data V1, that is, V1=X1xorG1; and similarly, the terminal device performs an exclusive OR operation on the second row vector X2 and the third row vector G1 to generate the scrambled rear string data V2, that is, V2=X2xorG1.

In this embodiment, the front string data and the rear string data are scrambled by using the Bloom filter method, and both the generated scrambled front string data V1 and the generated scrambled rear string data V2 are vectors. The two vectors are correlated with each other, so that the server performs data matching based on the two vectors. In addition, the Bloom filter method is simple, and is easy to implement.

According to the privacy data reporting method provided in this embodiment, the terminal device generates, based on the first hash value and the quantity m of elements in the preset Bloom filter vector, the first row vector with m elements, where the $(k1)^{th}$ element in the first row vector is 1, a remaining portion of elements are 0, and the value of k1 is equal to the first hash value; generates, based on the second hash value and the quantity m of elements in the preset Bloom filter vector, the second row vector with m elements, where the $(k2)^{th}$ element in the second row vector is 1, a remaining portion of elements are 0, and the value of k2 is equal to the second hash value; generates, based on the preset scrambling rate, the third row vector with m elements, where the proportion of the elements 1 in the third row vector is equal to the preset scrambling rate, and the elements 1 and the elements 0 in the third row vector are randomly and evenly distributed; and determines the scrambled front string data based on the first row vector and the third row vector, and determines the scrambled rear string data based on the second row vector and the third row vector. In this way, the scrambled front string data and the scrambled rear string data are accurately determined, and a whole scrambling process is simple, and easy to implement.

Figure 4:
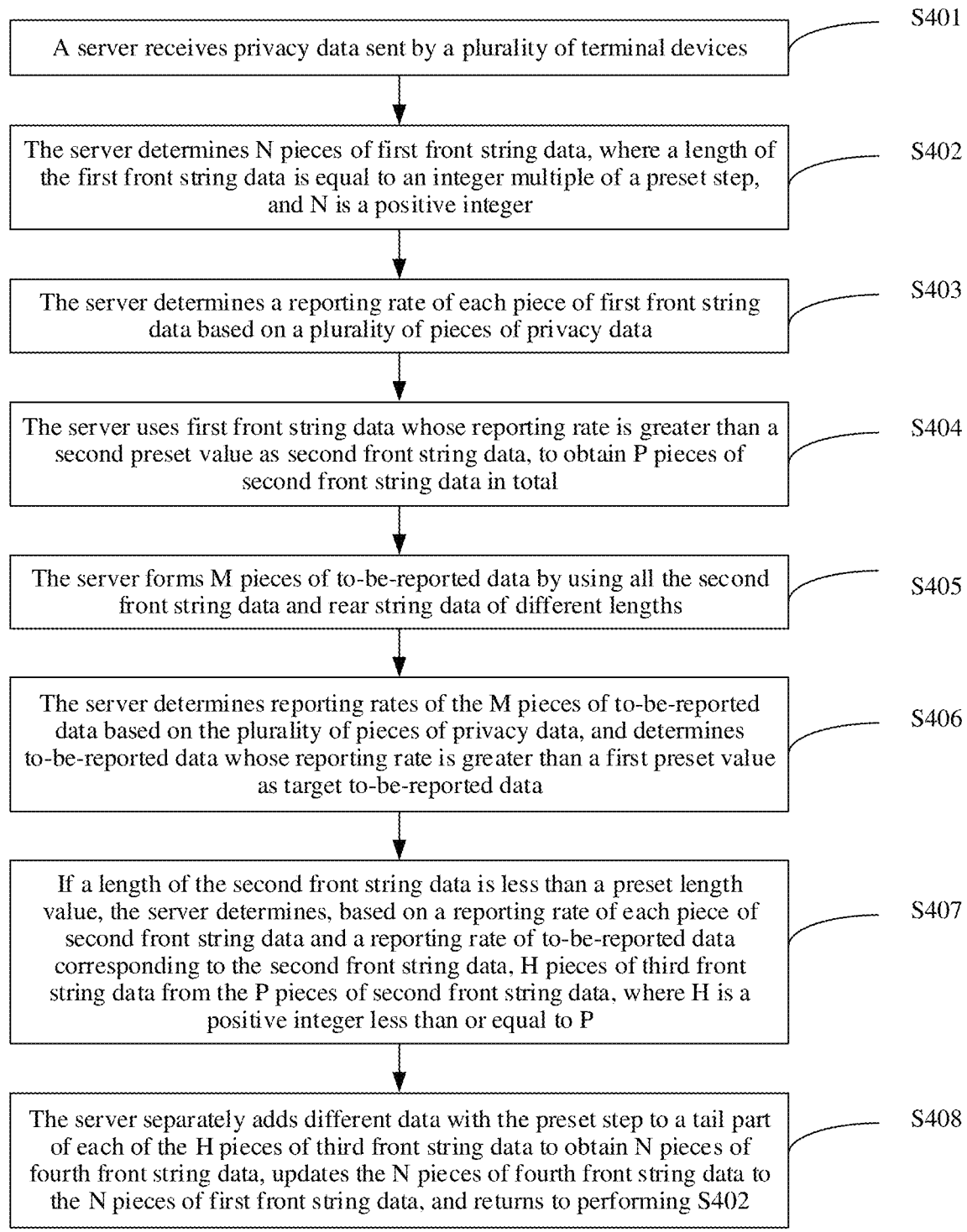
FIG. 4 is a flowchart of a privacy data reporting method according to Embodiment 4.
Figure 5:
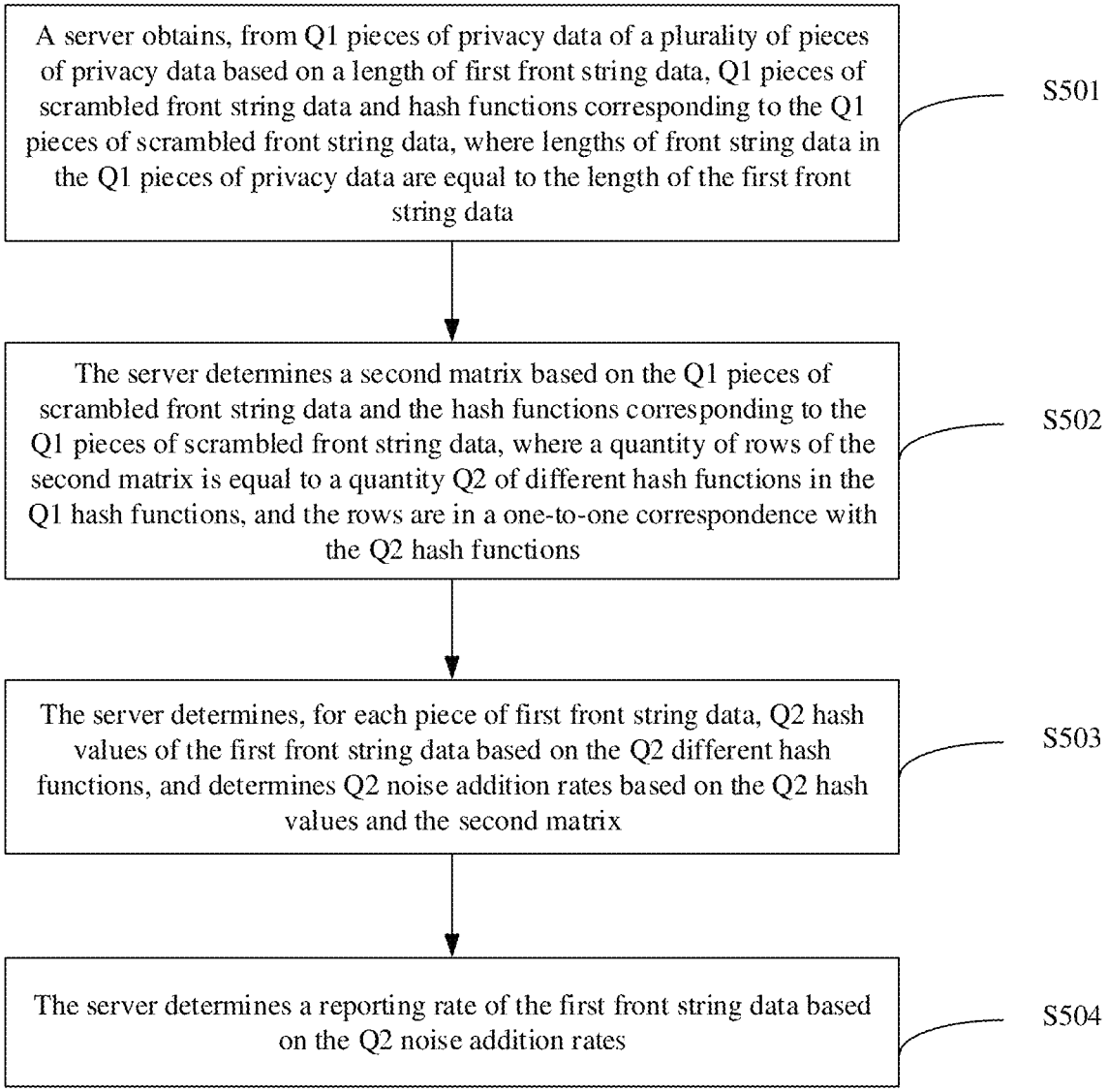
FIG. 5 is a flowchart of a privacy data reporting method according to Embodiment 5.

FIG. 4 is a flowchart of a privacy data reporting method according to Embodiment 4. Based on the foregoing embodiments, this embodiment relates to the following exemplary process: After receiving the privacy data sent by the plurality of terminal devices, the server determines to-be-reported data corresponding to each piece of privacy data. As shown in FIG. 5, the method in this embodiment may include the following steps.

In step S401, the server receives the privacy data sent by the plurality of terminal devices.

In step S402, the server determines the N pieces of first front string data, where the length of the first front string data is equal to an integer multiple of the preset step, and N is a positive integer.

Optionally, the preset step in this embodiment may be preconfigured in the server. In this case, the preset step used by the terminal device in the foregoing steps may be delivered by the server.

Optionally, the preset step may be carried in the privacy data.

In a process of matching front string data, all possible first front string data Pstr, each of which is (s1+step) in length, is obtained based on a length of the preset step "step", where s1 is a length of first front string data in a previous cycle, and s1 is 0 in the first cycle.

If to-be-reported data is a letter combination, a manner of generating Pstr is as follows: a character string in a front string set C(Pstr)||any letter combination whose length is equal to the step.

For example, the preset step is 2, and N pieces of first front string data generated in the first cycle are Pstr=aa, ab, ac, su, sw, ..., and zz.

In step S403, the server determines a reporting rate of each piece of first front string data based on the plurality of pieces of privacy data.

In step S404, the server uses first front string data whose reporting rate is greater than a second preset value as second front string data, to obtain P pieces of second front string data in total.

In step S405, the server forms the M pieces of to-be-reported data by using all the second front string data and the rear string data of different lengths.

Steps S403 to S405 are an exemplary implementation of step S107.

In an exemplary embodiment, after the N pieces of first front string data are generated according to the foregoing step, the reporting rate of each piece of first front string data is determined based on the privacy data. Then, the first front string data whose reporting rate is greater than the second preset value is used as the second front string data, to obtain the P pieces of second front string data. In other words, in this embodiment, the reporting rate of each piece of first front string data is calculated to implement screening of the first front string data, and the P pieces of second front string data whose reporting rate is greater than the second preset value are selected from the N pieces of first front string data, to filter out first front string data that does not satisfy a requirement. In this way, an amount of data used for matching is reduced, data matching accuracy is improved, and a data matching speed is increased.

After the P pieces of second front string data are obtained, the rear string data of different lengths is separately added to a tail part of each piece of second front string data to form different to-be-reported data, so as to obtain the M pieces of to-be-reported data.

For example, for a second character string su, rear string data whose length is 1 is added to a tail part of the second character string su to generate M1 pieces of to-be-reported data whose length is 3: sua, sub, ..., and suz; rear string data whose length is 2 is added to the tail part of the second character string su to generate M2 pieces of to-be-reported data whose length is 4: suaa, suab, ..., and suzz; rear string data whose length is 3 is added to the tail part of the second character string su to generate M3 pieces of to-be-reported data whose length is 5: suaaa, suaab, ..., and suzzz; and so on. In this way, rear string data of different lengths is separately added to the tail part of the second character string su to generate M pieces of to-be-reported data.

An exemplary manner of determining the reporting rate of each piece of first front string data based on the plurality of pieces of privacy data is not limited in this embodiment. In an example, the server may obtain all privacy data C1 that is in the privacy data and whose length of front string data is the same as the length of the first front string data, and use a ratio of a quantity of pieces of all the privacy data C1 to all privacy data received by the server as the reporting rate of the first front string data. In another example, scrambled front string data carried in all privacy data C1 is obtained, and the reporting rate of the first front string data is determined based on the scrambled front string data. For example, the scrambled front string data is intersected with each other or subtracted from each other to generate a row vector, an element value corresponding to a hash value of the first front string data in the row vector is obtained, and a ratio of the element value to a quantity of pieces of scrambled front string data as the reporting rate of the first front string data. Optionally, in this embodiment, the reporting rate of the first front string data may be determined according to another method and based on the plurality of pieces of privacy data.

In step S406, the server determines the reporting rates of the M pieces of to-be-reported data based on the plurality of pieces of privacy data, and determines the to-be-reported data whose reporting rate is greater than the first preset value as target to-be-reported data.

In an exemplary embodiment, after obtaining the M pieces of to-be-reported data according to the foregoing steps, the server determines a reporting rate of each of the M pieces of to-be-reported data based on the plurality of pieces of privacy data sent by the terminal devices, and uses the to-be-reported data whose reporting rate is greater than the first preset value in the M pieces of to-be-reported data as the target to-be-reported data that is to be actually reported by the terminal device.

An exemplary manner in which the server determines the reporting rates of the M pieces of to-be-reported data based on the plurality of pieces of privacy data is not limited in this embodiment. In an example, the server may obtain all privacy data C2 that is in the privacy data, whose length of front string data is the same as the length of the first front string data, and whose length of rear string data is the same as a length of rear string data in the to-be-reported data; and use a ratio of a quantity of pieces of all the privacy data C2 to all privacy data received by the server as a reporting rate of the to-be-reported data. In another example, scrambled front string data carried in all privacy data C2 is obtained, and a reporting rate of the to-be-reported data is determined based on the scrambled front string data (or scrambled rear string data). For example, the scrambled front string data (or scrambled rear string data) is intersected with each other or subtracted from each other to generate a row vector, an element value corresponding to a hash value of the to-be-reported data in the row vector is obtained, and a ratio of the element value to a quantity of pieces of scrambled front string data (or scrambled rear string data) is used as the reporting rate of the to-be-reported data. Optionally, in this embodiment, the reporting rate of the to-be-reported data may be determined according to another method and based on the plurality of pieces of privacy data.

In step S407, if a length of the second front string data is less than a preset length value, the server determines H pieces of third front string data from the P pieces of second front string data based on a reporting rate of each piece of second front string data and a reporting rate of to-be-reported data corresponding to the second front string data.

In step S408, the server separately adds different data with the preset step to a tail part of each of the H pieces of third front string data to obtain N pieces of fourth front string data, updates the N pieces of fourth front string data to the N pieces of first front string data, and returns to perform step S402.

In a process of the current round of matching, after the server determines the reporting rates of the M pieces of to-be-reported data, and determines the to-be-reported data whose reporting rate is greater than the first preset value as the target reported data, if this cycle does not end, the server needs to perform screening on the P pieces of second front string data to select the H pieces of third front string data that satisfy a requirement. Then, the server increases lengths of the H pieces of third front string data to generate a plurality of pieces of fourth front string data, updates the first front string data in step S402 by using the fourth front string data, performs a next round of matching, and repeats the foregoing steps until the length of the second front string data is greater than or equal to the preset length value.

According to the foregoing steps, the server performs matching in a manner of continuously increasing the length of the first front string data, thereby improving data processing efficiency. For example, for 12-character English letters, a search space size is $(26^{12})$. When the method in this application is used, a search space size (it is assumed that step=2) is $6 \times (26^2)$.

During actual execution, the server determines whether the length of the second front string data in the current round is less than the preset length value. If the length of the second front string data in the current round is less than the preset length value, the server determines the H pieces of third front string data from the P pieces of second front string data based on the reporting rate of each piece of second front string data and the reporting rate of the to-be-reported data corresponding to the second front string data. For each piece of third front string data, different data with a preset step (for example, 2) is separately added to a tail part of the third front string data, to form a plurality of pieces of fourth front string data. According to the method, the N pieces of fourth front string data may be generated from the H pieces of third front string data, and then the N pieces of fourth front string data in this case are used as N pieces of first front string data in a next round.

It should be noted that quantities of first front string data in all rounds may be the same or may be different, that is, N may remain unchanged or may change in all cycles.

To further describe the technical solution in an exemplary embodiment, the following example is provided.

It is assumed that the preset step is 2 and the preset length value is 6. First, the server determines N pieces of first front string data in the first round: Pstr=aa, ab, ac, su, sw, and zz. Then, the server calculates a reporting rate of each piece of first front string data, and uses first front string data whose reporting rate is greater than the second preset value as second front string data, to obtain P pieces of second front string data. For example, two pieces of second front string data obtained in the first round are su and sw. The server forms M pieces of to-be-reported data by using the second front string data su and sw and rear string data of different lengths, where the M pieces of to-be-reported data are Nstr=suaa, suab, summ, suzz, swaa, swab, . . . , swmm, . . . , and swzz; and calculates a reporting rate of each of the M pieces of to-be-reported data, and determines to-be-reported data whose reporting rate is greater than the first preset value as target to-be-reported data. Then, if determining that lengths of the second front string data su and sw are less than the preset length value 6, the server determines third front string data from the second front string data su and sw based on reporting rates of the second front string data su and sw and reporting rates of to-be-reported data corresponding to the second front string data su and sw. For example, the determined third front string data is su. Next, the server separately adds different data with the preset step to a tail part of the third front string data su to obtain N pieces of fourth front string data Pstr=suaa, suab, suac, summ, sumn, . . . , and suzz, updates the first front string data to Pstr=suaa, suab, suac, summ, sumn, . . . , and suzz to complete the first round of matching, and returns to perform the foregoing steps until the length of the second front string data is greater than or equal to the preset length value 6.

In this embodiment, the server performs matching on the to-be-reported data in two directions, namely, a head direction and a tail direction. In this way, the to-be-reported data can be quickly found. In addition, during matching, matching is performed in a manner of gradually increasing a length of front string data, thereby improving processing efficiency.

An exemplary manner in which the server determines, based on the reporting rate of each piece of second front string data and the reporting rate of the to-be-reported data corresponding to the second front string data, the H pieces of third front string data from the P pieces of second front string data is not limited in this embodiment. For example, for one piece of second front string data, a maximum value of reporting rates of M pieces of to-be-reported data corresponding to the second front string data is obtained; and if a reporting rate of the second front string data is greater than or equal to the maximum value, the second front string data may be used as the third front string data. Alternatively, a sum of the reporting rates of the M pieces of to-be-reported data corresponding to the second front string data is obtained; and if a ratio of the reporting rate of the second front string data to the sum is greater than or equal to 1, the second front string data may be used as the third front string data.

In a possible implementation of this embodiment, step S407 may include the following steps.

In step S407a, the server determines a remaining reporting rate of each piece of second front string data based on the reporting rate of the second front string data and reporting rates of all to-be-reported data corresponding to the second front string data.

An exemplary method for determining, by the server, the remaining reporting rate of each piece of second front string data based on the reporting rate of the second front string data and the reporting rates of all the to-be-reported data corresponding to the second front string data is not limited in this embodiment. For example, for one piece of second front string data, a maximum value of reporting rates of all to-be-reported data corresponding to the second front string data is obtained, and a difference between a reporting rate of the second front string data and the maximum value is used as a remaining reporting rate of the second front string data. Optionally, a sum of weighted values of the reporting rates of all the to-be-reported data corresponding to the second front string data are obtained, and a difference between the reporting rate of the second front string data and the sum of the weighted values is used as a remaining reporting rate of the second front string data.

In another possible implementation of this embodiment, step S407a may include: obtaining, for each piece of second front string data, a sum of the reporting rates of all the to-be-reported data corresponding to the second front string data, and determining, as a remaining reporting rate of the second front string data, a difference between a reporting rate of the second front string data and the sum.

In an exemplary embodiment, for one piece of second front string data, a reporting rate of the second front string data is PstrR1, a sum of reporting rates of all to-be-reported data corresponding to the second front string data is $\Sigma NstrRw1$, and a remaining reporting rate of the second front string data is $PstrR1 - \Sigma NstrRw1$.

In step S407b, the server determines second front string data whose remaining reporting rate is greater than or equal to a third preset value as third front string data, to obtain the H pieces of third front string data.

In an exemplary embodiment, for each piece of second front string data, the server determines a remaining reporting rate of the second front string data based on a reporting rate of the second front string data and reporting rates of all to-be-reported data corresponding to the second front string data. If the remaining reporting rate of the second front string data is greater than or equal to the third preset value, it indicates that the second front string data matches a plurality of pieces of rear string data. In this case, the second front string data is retained, and the second front string data is determined as the third front string data. If the remaining reporting rate of the second front string data is less than the third preset value, it indicates that the second front string data does not match the plurality of pieces of rear string data. In this case, the second front string data is deleted. In this way, accurate screening of the second front string data can be implemented, thereby further improving data matching accuracy and increasing a data matching speed.

According to the privacy data reporting method provided in this embodiment, the server receives the privacy data sent by the plurality of terminal devices, determines the N pieces of first front string data, determines the reporting rate of each piece of first front string data based on the plurality of pieces of privacy data, uses the first front string data whose reporting rate is greater than the second preset value as the second front string data, and forms the M pieces of to-bereported data by using all the second front string data and the rear string data of different lengths. If the length of the second front string data is less than the preset length value, the server determines the H pieces of third front string data from the P pieces of second front string data based on the reporting rate of each piece of second front string data and the reporting rate of the to-be-reported data corresponding to the second front string data; and separately adds different data with the preset step to the tail part of each of the H pieces of third front string data to obtain the N pieces of fourth front string data, updates the N pieces of fourth front string data to the N pieces of first front string data, and returns to perform the foregoing steps until the length of the second front string data is greater than or equal to the preset length value. In other words, in this embodiment, the server performs matching on the to-be-reported data in the two directions, namely, the head direction and the tail direction. In this way, the to-be-reported data can be quickly found. In addition, during matching, matching is performed in the manner of gradually increasing a length of front string data, thereby improving processing efficiency.

Optionally, the privacy data in this embodiment includes a length of front string data, a length of rear string data, scrambled front string data, scrambled rear string data, and hash functions corresponding to the scrambled front string data and the scrambled rear string data.

FIG. 5 is a flowchart of a privacy data reporting method according to Embodiment 5. Based on the foregoing embodiments, this embodiment relates to an exemplary process in which the server determines the reporting rate of each piece of first front string data based on the plurality of pieces of privacy data. As shown in FIG. 5, step S403 may include the following steps.

In step S501, the server obtains, from Q1 pieces of privacy data of the plurality of pieces of privacy data based on the length of the first front string data, Q1 pieces of scrambled front string data and hash functions corresponding to the Q1 pieces of scrambled front string data, where lengths of front string data in the Q1 pieces of privacy data are equal to the length of the first front string data.

This step is to obtain privacy data related to the first front string data, where the privacy data includes lengths of front string data and rear string data that are corresponding to to-be-reported data, and a hash function used to scramble the front string data to obtain scrambled front string data and scramble the rear string data to obtain scrambled rear string data. Therefore, the privacy data related to the first front string data may be determined by using the length of the first front string data as a reference.

For example, if the length of the first front string data is 4, the server obtains, from the plurality of pieces of privacy data sent by the plurality of terminal devices, privacy data whose length of front string data is also 4 in all the privacy data. In this way, Q1 pieces of privacy data can be obtained.

After the Q1 pieces of privacy data are obtained, scrambled front string data and hash functions that are included in the Q1 pieces of privacy data are obtained.

In step S502, the server determines a second matrix based on the Q1 pieces of scrambled front string data and the hash functions corresponding to the Q1 pieces of scrambled front string data, where a quantity of rows of the second matrix is equal to a quantity Q2 of different hash functions in the Q1 hash functions, and the rows are in a one-to-one correspondence with the Q2 hash functions.

One piece of scrambled front string data obtained above is corresponding to one hash function, and different terminal devices may select a same hash function. Therefore, a quantity of different hash functions in the Q1 hash functions is Q2, where Q2 is less than or equal to Q1.

In this way, the second matrix with Q2 rows can be generated in a manner of generating one row of the second matrix by performing a corresponding operation (for example, an addition operation or a subtraction operation) on scrambled front string data corresponding to a same hash function.

In step S503, the server determines, for each piece of first front string data, Q2 hash values of the first front string data based on the Q2 different hash functions, and determines Q2 noise addition rates based on the Q2 hash values and the second matrix.

It may be contemplated that the Q2 different hash functions may be obtained corresponding to the length of the first front string data in the current round. In this way, for each piece of first front string data, the Q2 hash values of the first front string data may be obtained based on the Q2 different hash functions.

For example, for first front string data 1, the first front string data 1 is substituted into the Q2 different hash functions to obtain Q2 hash values. Then, Q2 noise addition rates are determined based on the Q2 hash values and the second matrix.

An exemplary manner of determining the Q2 noise addition rates based on the Q2 hash values and the second matrix is not limited in this embodiment. A hash value is used as an example. The second matrix is searched for an element corresponding to the hash value. A noise addition rate corresponding to the hash value is determined based on the element. For example, a ratio of the element to Q2 is used as the noise addition rate corresponding to the hash value.

In an implementation of this embodiment, step S503 may include the following steps.

In step S503a the server obtains, for each hash value and from the second matrix, elements in a row corresponding to a hash function related to the hash value k3, and obtains the $(k3)^{th}$ element from the elements in the row, where the hash function related to the hash value k3 is a hash function that is used to obtain the hash value k3 based on the first front string data.

In step S503b, the server obtains, from the Q1 pieces of scrambled front string data, a quantity Q3 of pieces of scrambled front string data corresponding to the hash function related to the hash value k3.

In step S503c, the server determines, based on the element and Q3, a noise addition rate corresponding to the hash value k3.

In this embodiment, methods for obtaining noise addition rates corresponding to all hash values of all first front string data are the same. In this embodiment, a hash value k3 corresponding to one piece of first front string data is used as an example for description as follows.

First, a hash function a that is used to obtain the hash value k3 based on the first front string data is obtained, and elements in a row corresponding to the hash function a are obtained from the second matrix. Then, the $(k3)^{th}$ element (for example, an element x1k) is obtained from the elements in the row.

Then, a quantity Q3 of scrambled front string data corresponding to the hash function a is obtained from the Q1 pieces of scrambled front string data, where Q3 is less than or equal to Q1. Finally, a noise addition rate corresponding to the hash value k3 is determined based on the element x1k and the quantity Q3 of scrambled front string data. For example, x1k/Q3 is used as the noise addition rate PKstr corresponding to the hash value k3.

According to the foregoing steps, Q2 noise addition rates of each piece of first front string data may be obtained.

In step S504, the server determines the reporting rate of the first front string data based on the Q2 noise addition rates.

In this step, a manner of determining the reporting rate of the first front string data based on the Q2 noise addition rates is not limited. For example, a minimum value of the Q2 noise addition rates may be used as the reporting rate of the first front string data directly, or a median value of the Q2 noise addition rates may be used as the reporting rate of the first front string data directly.

In an implementation of this embodiment, step S504 may include the following step.

In step S504a, determine the reporting rate of the first front string data based on the Q2 noise addition rates and a first noise amplitude.

For example, a difference between each of the Q2 noise addition rates and the first noise amplitude is determined, and a minimum difference is used as the reporting rate of the first front string data.

Optionally, the difference between each of the Q2 noise addition rates and the first noise amplitude is determined, and a minimum value of ratios between Q2 differences and a second noise amplitude is used as the reporting rate of the first front string data, where the second noise amplitude is a difference between a constant and twice the first noise amplitude. For example, the reporting rate of the first front string data is determined according to a formula PKstrR=min[(PKstri−f)/(1−2f)], where PKstri is a noise addition rate that is for the first front string data and that is related to a hash function i, f is the first noise amplitude, and 1−2f is the second noise amplitude.

According to the privacy data reporting method provided in this embodiment, the server obtains, from the Q1 pieces of privacy data of the plurality of pieces of privacy data based on the length of the first front string data, the Q1 pieces of scrambled front string data and the hash functions corresponding to the Q1 pieces of scrambled front string data, where the lengths of the front string data in the Q1 pieces of privacy data are equal to the length of the first front string data; determines the second matrix based on the Q1 pieces of scrambled front string data and the hash functions corresponding to the Q1 pieces of scrambled front string data; then determines, for each piece of first front string data, the Q2 hash values of the first front string data based on the Q2 different hash functions, and determines the Q2 noise addition rates based on the Q2 hash values and the second matrix; and finally determines the reporting rate of the first front string data based on the Q2 noise addition rates. In this way, the reporting rate of the first front string data is accurately obtained.

Figure 6:
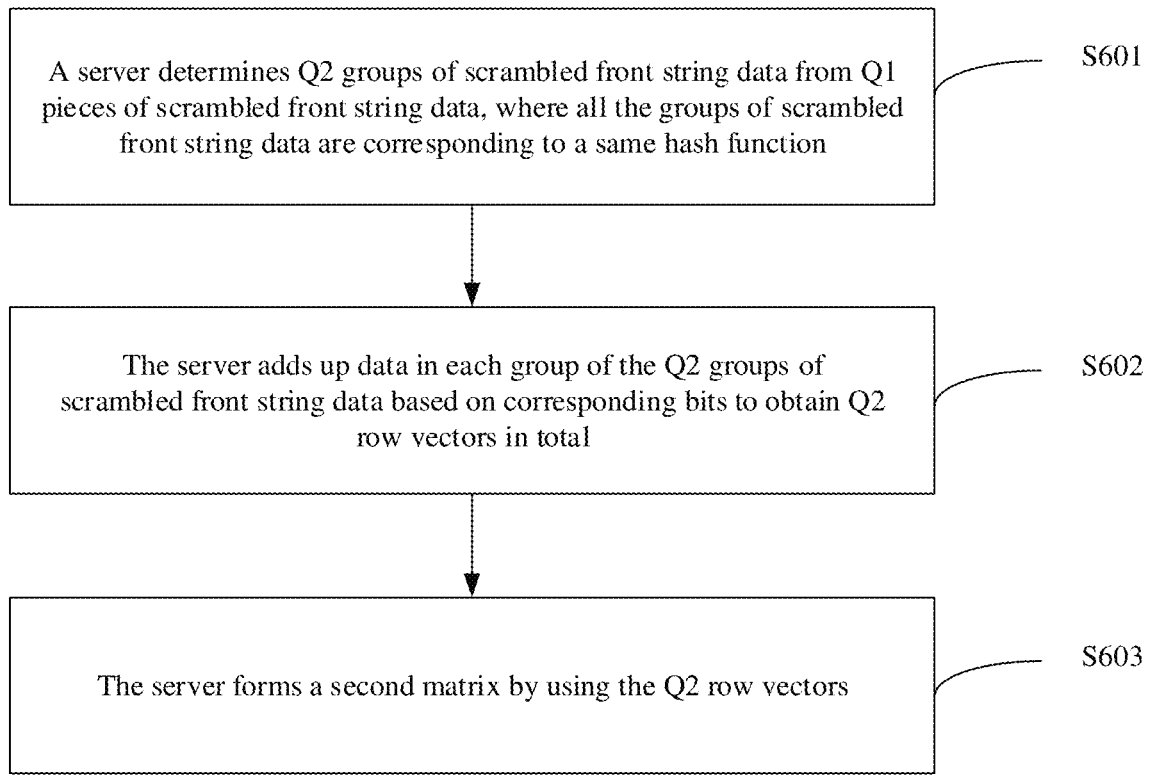
FIG. 6 is a flowchart of a privacy data reporting method according to Embodiment 6.

FIG. 6 is a flowchart of a privacy data reporting method according to Embodiment 6. Based on the foregoing embodiments, this embodiment relates to the following exemplary process: If the scrambled front string data is a row vector, the server determines the second matrix based on the Q1 pieces of scrambled front string data and the hash functions corresponding to the Q1 pieces of scrambled front string data. As shown in FIG. 6, step S502 may include the following steps.

In step S601, the server determines Q2 groups of scrambled front string data from the Q1 pieces of scrambled front string data, where each group of scrambled front string data is corresponding to a same hash function.

In step S602, the server adds up data in each group of the Q2 groups of scrambled front string data based on corresponding bits to obtain Q2 row vectors in total.

In step S603, the server forms the second matrix by using the Q2 row vectors.

According to the foregoing embodiment in which the terminal device scrambles the front string data and the rear string data, it may be contemplated that, when the terminal device uses different scrambling manners, two types of scrambled data are generated: a row vector and a value.

In this embodiment, if the scrambled front string data reported by the terminal device is a row vector, an exemplary process of determining the second matrix is as follows: First, the Q1 pieces of scrambled front string data are grouped, and scrambled front string data obtained through conversion based on a same hash function is classified as one group. In this way, the Q2 groups of scrambled front string data can be obtained, where Q2 is less than or equal to Q1.

Then, scrambled front string data in a same group is added up based on corresponding bits. For example, a group includes two pieces of scrambled front string data: a vector v1 and a vector v2, where both the vector v1 and the vector v2 are 1024-bit vectors. The vector v1 and the vector v2 are added up as follows: A first bit of the vector v1 and a first bit of the vector v2 are added up, and a second bit of the vector v1 and a second bit of the vector v2 are added up. Such an operation is repeated 1024 times to obtain a 1024-bit vector. In this way, Q2 row vectors can be obtained for the Q2 groups of scrambled front string data.

The second matrix is formed by using the Q2 row vectors. For example, the Q2 row vectors are arranged in a time sequence to form the second matrix.

The second matrix in this embodiment is generated based on the Q1 pieces of scrambled front string data reported by the terminal devices. In this way, the second matrix is correlated with front string data in reported data from the terminal devices. Therefore, search accuracy can be improved by searching for the reported data from the terminal devices based on the second matrix.

According to the privacy data reporting method provided in this embodiment, if the scrambled front string data is a row vector, the server determines the Q2 groups of scrambled front string data from the Q1 pieces of scrambled front string data, where each group of scrambled front string data is corresponding to a same hash function; adds up data in each group of the Q2 groups of scrambled front string data based on corresponding bits to obtain the Q2 row vectors in total; and forms the second matrix by using the Q2 row vectors. In this way, the second matrix is accurately established, and the established second matrix is correlated with the front string data in the reported data from the terminal devices. Therefore, the search accuracy can be improved by searching for the reported data from the terminal devices based on the second matrix.

Figure 7:
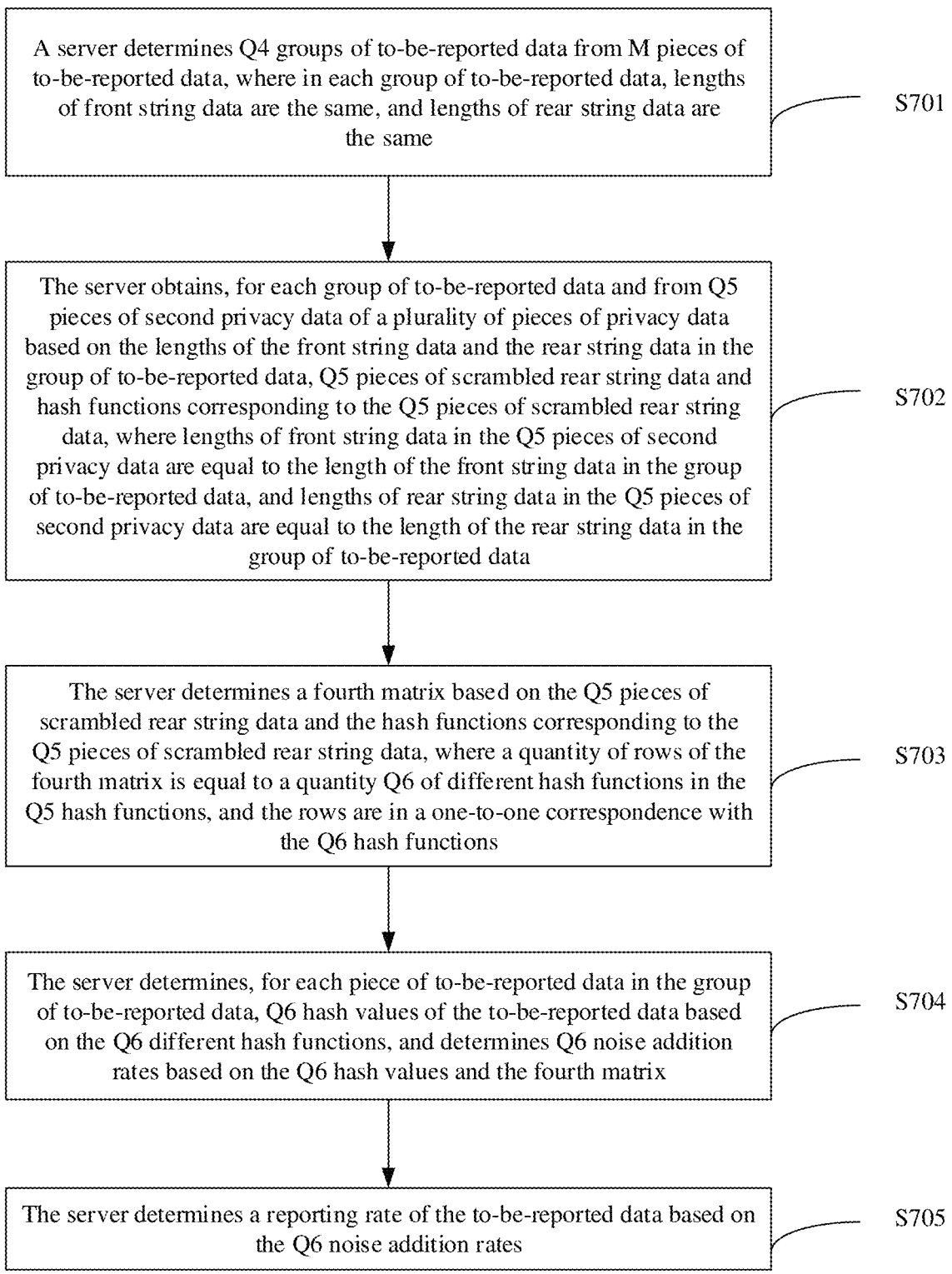
FIG. 7 is a flowchart of a privacy data reporting method according to Embodiment 7.

FIG. 7 is a flowchart of a privacy data reporting method according to Embodiment 7. Based on the foregoing embodiments, this embodiment relates to an exemplary process in which the server determines the reporting rates of the M pieces of to-be-reported data based on the plurality of pieces of privacy data. As shown in FIG. 7, step S406 may include the following steps.

In step S701, the server determines Q4 groups of to-be-reported data from the M pieces of to-be-reported data, where in each group of to-be-reported data, lengths of front string data are the same, and lengths of rear string data are the same.

This embodiment relates to a matching process of rear string data. For example, the M pieces of to-be-reported data are searched for to-be-reported data sent by the terminal devices. An exemplary process thereof is similar to the foregoing matching process of front string data. For details, refer to the description in the foregoing embodiment.

First, the M pieces of to-be-reported data are grouped, and to-be-reported data with front string data of a same length and rear string data of a same length are classified as one group. In this way, the Q4 groups of to-be-reported data can be obtained.

In step S702, the server obtains, for each group of to-be-reported data and from Q5 pieces of second privacy data of the plurality of pieces of privacy data based on the lengths of the front string data and the rear string data in the group of to-be-reported data, Q5 pieces of scrambled rear string data and hash functions corresponding to the Q5 pieces of scrambled rear string data, where lengths of front string data in the Q5 pieces of second privacy data are equal to the length of the front string data in the group of to-be-reported data, and lengths of rear string data in the Q5 pieces of second privacy data are equal to the length of the rear string data in the group of to-be-reported data.

In this embodiment, operations on all the groups of to-be-reported data are the same, and one group of to-be-reported data is used as an example for description.

For example, if a length of front string data in the group of to-be-reported data is 2, and rear string data in the group of to-be-reported data is 3, privacy data whose length of front string data is 2 and whose length of rear string data is 3 is obtained from the plurality of pieces of privacy data, and the privacy data is denoted as second privacy data. In this way, Q5 pieces of second privacy data corresponding to the group of to-be-reported data can be obtained.

Then, scrambled rear string data and hash functions corresponding to the scrambled rear string data that are included in each of the Q5 pieces of second privacy data are obtained.

In step S703, the server determines a fourth matrix based on the Q5 pieces of scrambled rear string data and the hash functions corresponding to the Q5 pieces of scrambled rear string data, where a quantity of rows of the fourth matrix is equal to a quantity Q6 of different hash functions in the Q5 hash functions, and the rows are in a one-to-one correspondence with the Q6 hash functions.

The process of determining the fourth matrix is the same as the foregoing process of determining the second matrix. For details about the process of determining the fourth matrix, refer to the description in the foregoing embodiment, and details are not described herein again.

In step S704, the server determines, for each piece of to-be-reported data in the group of to-be-reported data, Q6 hash values of the to-be-reported data based on the Q6 different hash functions, and determines Q6 noise addition rates based on the Q6 hash values and the fourth matrix.

This step is consistent with the foregoing process of determining the Q2 noise addition rates in step S603. For details about this step, refer to the description in the foregoing embodiment, and details are not described herein again.

In a possible implementation of this embodiment, that the server determines Q6 noise addition rates based on the Q6 hash values and the fourth matrix in step S704 may include the following steps.

In step S704a, the server obtains, for each hash value and from the fourth matrix, elements in a row corresponding to a hash function related to the hash value k4, and obtains the $(k4)^{th}$ element from the elements in the row, where the hash function related to the hash value k4 is a hash function that is used to obtain the hash value k4 based on the to-be-reported data.

In step S704b, the server obtains, from the Q5 pieces of scrambled rear string data, a quantity Q7 of pieces of scrambled rear string data corresponding to the hash function related to the hash value k4.

In step S704c, the server determines, based on the element and Q7, a noise addition rate corresponding to the hash value k4.

Steps S704a to S704c in this embodiment are the same as the process of steps S503a to S503c. For details about steps S704a to S704c, refer to the description in the foregoing embodiment, and details are not described herein again.

In step S705, the server determines a reporting rate of the to-be-reported data based on the Q6 noise addition rates.

In this step, a manner of determining the reporting rate of the to-be-reported data based on the Q6 noise addition rates is not limited. For example, a minimum value of the Q6 noise addition rates may be used as the reporting rate of the to-be-reported data directly, or a median value of the Q6 noise addition rates may be used as the reporting rate of the to-be-reported data directly.

In a possible implementation of this embodiment, step S705 may include the following step.

In step S705a, the server determines the reporting rate of the to-be-reported data based on the Q6 noise addition rates and a first noise amplitude.

For example, a difference between each of the Q6 noise addition rates and the first noise amplitude is determined, and a minimum difference is used as the reporting rate of the to-be-reported data.

Optionally, the difference between each of the Q6 noise addition rates and the first noise amplitude is determined, and a minimum value of ratios between Q6 differences and a second noise amplitude is used as the reporting rate of the to-be-reported data, where the second noise amplitude is a difference between a constant and twice the first noise amplitude.

For example, the reporting rate of the to-be-reported data is determined according to a formula NKstrR=min[(NKstri−f)/(1−2f)], where NKstri is a noise addition rate that is for the to-be-reported data and that is related to a hash function i, f is the first noise amplitude, and 1−2f is the second noise amplitude.

In this embodiment, the noise addition rate of the to-be-reported data is a noise addition rate of rear string data in the to-be-reported data.

According to the privacy data reporting method provided in this embodiment, the server determines the Q4 groups of to-be-reported data from the M pieces of to-be-reported data, and obtains, for each group of to-be-reported data and from the Q5 pieces of second privacy data of the plurality of pieces of privacy data based on the lengths of front string data and rear string data in the group of to-be-reported data, the Q5 pieces of scrambled rear string data and the hash functions corresponding to the Q5 pieces of scrambled rear string data; then the server determines the fourth matrix based on the Q5 pieces of scrambled rear string data and the hash functions corresponding to the Q5 pieces of scrambled rear string data; and finally the server determines, for each piece of to-be-reported data in the group of to-be-reported data, the Q6 hash values of the to-be-reported data based on the Q6 different hash functions, determines the Q6 noise addition rates based on the Q6 hash values and the fourth matrix, and determines the reporting rate of the to-bereported data based on the Q6 noise addition rates. In this way, the reporting rate of the to-be-reported data is accurately obtained. In addition, in this embodiment, the reporting rates of the to-be-reported data are determined based on the privacy data reported by the terminal devices, so that the reporting rates of the to-be-reported data are related to the privacy data reported by the terminal devices. In this way, by searching for reported data from the terminal devices based on these pieces of to-be-reported data, accuracy of searching for the to-be-reported data can be improved.

Figure 8:
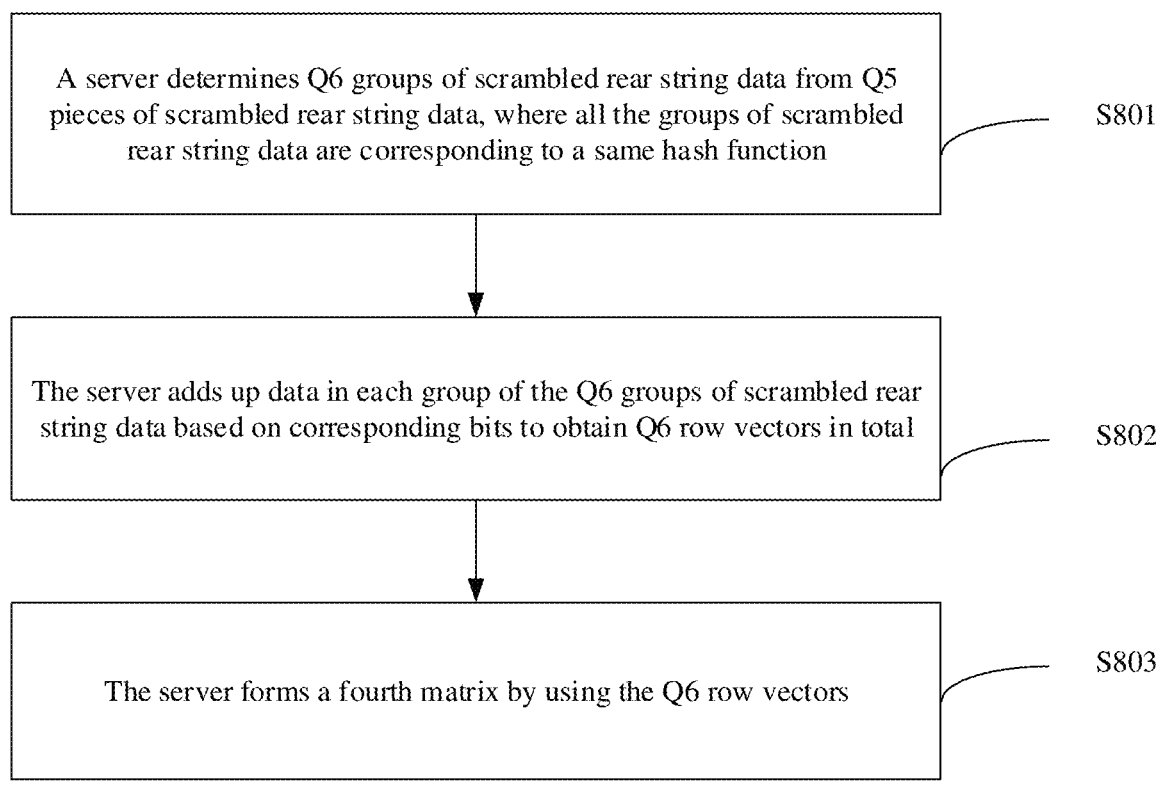
FIG. 8 is a flowchart of a privacy data reporting method according to Embodiment 8.

FIG. 8 is a flowchart of a privacy data reporting method according to Embodiment 8. Based on the foregoing embodiments, this embodiment relates to the following exemplary process: If the scrambled rear string data is a row vector, the server determines the fourth matrix based on the Q5 pieces of scrambled rear string data and the hash functions corresponding to the Q5 pieces of scrambled rear string data. As shown in FIG. 8, step S703 may include the following steps.

In step S801, the server determines Q6 groups of scrambled rear string data from the Q5 pieces of scrambled rear string data, where each group of scrambled rear string data is corresponding to a same hash function.

In step S802, the server adds up data in each group of the Q6 groups of scrambled rear string data based on corresponding bits to obtain Q6 row vectors in total.

In step S803, the server forms the fourth matrix by using the Q6 row vectors.

According to the foregoing embodiment in which the terminal device scrambles the front string data and the rear string data, it may be understood that, when the terminal device uses different scrambling manners, two types of scrambled data are generated: a row vector and a value.

In this embodiment, if the scrambled rear string data reported by the terminal device is a row vector, an exemplary process of determining the fourth matrix is as follows: First, the Q5 pieces of scrambled rear string data are grouped, and scrambled rear string data obtained through conversion based on a same hash function is classified as one group. In this way, the Q6 groups of scrambled rear string data can be obtained, where Q6 is less than or equal to Q5.

Then, scrambled rear string data in a same group is added up based on corresponding bits to obtain Q6 row vectors.

The second matrix is formed by using the Q6 row vectors.

The process of determining the fourth matrix in this embodiment is consistent with the foregoing process of determining the second matrix. For details about the process of determining the fourth matrix, refer to the description in the foregoing embodiment.

The fourth matrix in this embodiment is generated based on the scrambled rear string data reported by the terminal devices. In this way, the fourth matrix is correlated with rear string data in reported data from the terminal devices. Therefore, search accuracy can be improved by searching for the reported data from the terminal devices based on the fourth matrix.

According to the privacy data reporting method provided in this embodiment, if the scrambled rear string data is a row vector, the server determines Q6 groups of scrambled front string data from the Q5 pieces of scrambled rear string data, where each group of scrambled rear string data is corresponding to a same hash function; adds up data in each group of the Q6 groups of scrambled rear string data based on corresponding bits to obtain the Q6 row vectors in total; and forms the fourth matrix by using the Q6 row vectors. In this way, the fourth matrix is accurately established, and the established fourth matrix is correlated with the rear string data in the reported data from the terminal devices. Therefore, the search accuracy can be improved by searching for the reported data from the terminal devices based on the fourth matrix.

Figure 9:
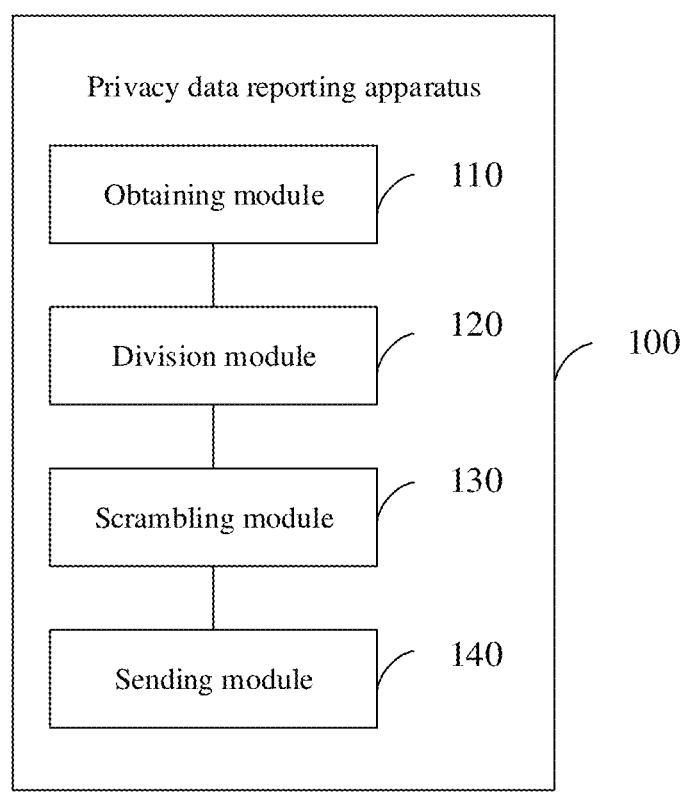
FIG. 9 is a framework diagram of a privacy data reporting apparatus according to Embodiment 1.

FIG. 9 is a framework diagram of a privacy data reporting apparatus according to Embodiment 1. As shown in FIG. 9, the privacy data reporting apparatus 100 in this embodiment is a part of a terminal device or the entire terminal device. As shown in FIG. 9, the privacy data reporting apparatus 100 includes:

an obtaining module 110, configured to obtain to-be-reported data;

a division module 120, configured to divide the to-be-reported data into front string data and rear string data based on a preset step, where a length of the front string data is an integer multiple of the preset step, and the rear string data is data in the to-be-reported data other than the front string data;

a scrambling module 130, configured to separately scramble the front string data and the rear string data according to a preset scrambling algorithm, to generate privacy data; and a sending module 140, configured to send the privacy data to a server.

The apparatus in this embodiment may be used to execute the technical solutions of the foregoing method embodiment. The implementation principles and technical effects are similar, and are not further described herein.

Figure 10:
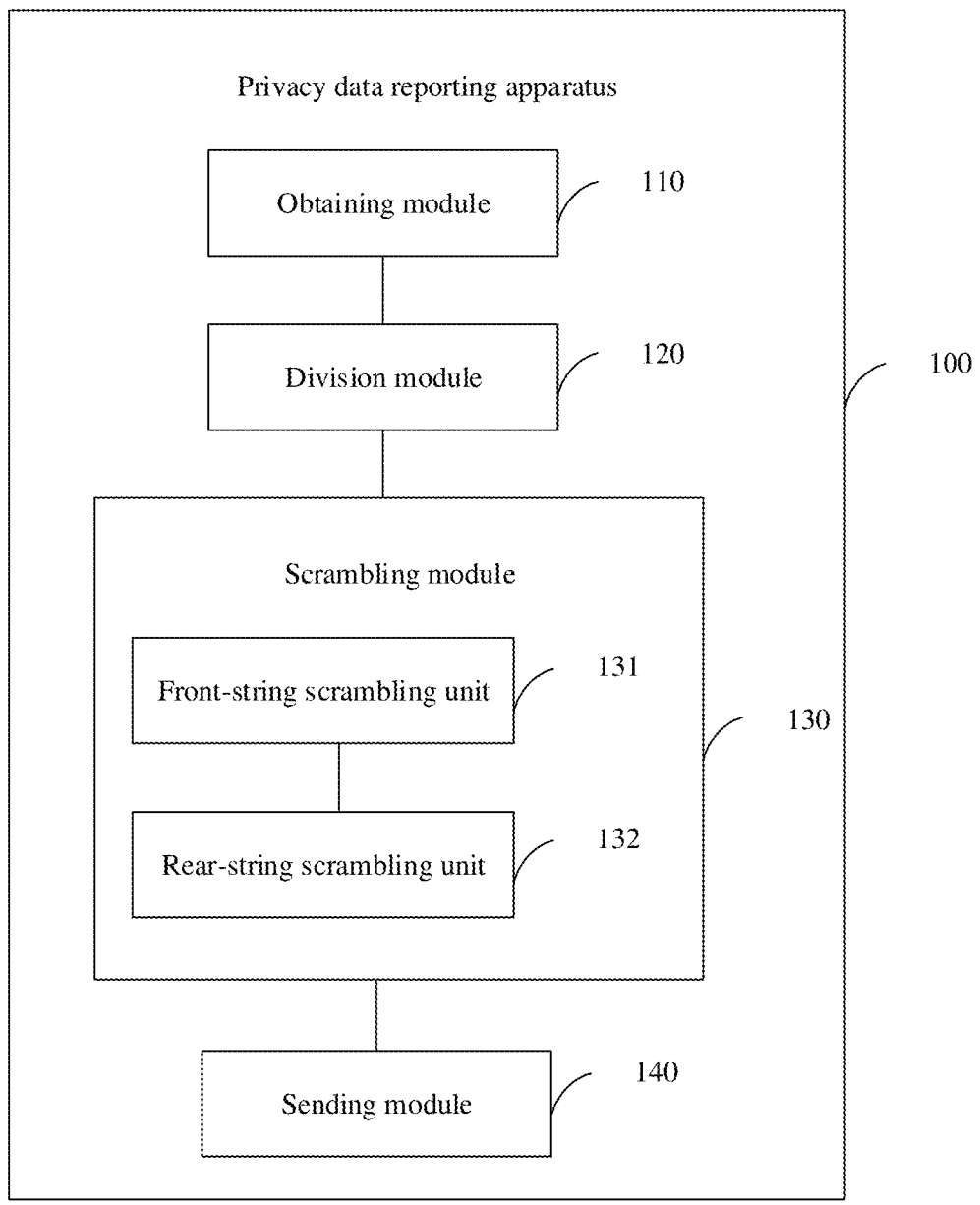
FIG. 10 is a framework diagram of a privacy data reporting apparatus according to Embodiment 2.

FIG. 10 is a framework diagram of a privacy data reporting apparatus according to Embodiment 2. Based on the foregoing embodiment, the privacy data includes scrambled front string data and scrambled rear string data, and the scrambling module 130 includes a front-string scrambling unit 131 and a rear-string scrambling unit 132.

The front-string scrambling unit 131 is configured to determine, based on a preset hash function, a first hash value corresponding to the front string data and a second hash value corresponding to the rear string data.

The rear-string scrambling unit 132 is configured to generate, according to the preset scrambling algorithm, scrambled front string data corresponding to the first hash value and scrambled rear string data corresponding to the second hash value.

In a possible implementation of this embodiment, the front-string scrambling unit 131 is configured to determine the first hash value of the front string data based on the preset hash function; and the rear-string scrambling unit 132 is configured to determine, based on the preset hash function, a second hash value of data formed by the first hash value and the rear string data.

In a possible implementation of this embodiment, the privacy data further includes the length of the front string data, a length of the rear string data, and the preset hash function.

The apparatus in this embodiment may be used to execute the technical solutions of the foregoing method embodiments. The implementation principles and technical effects are similar, and are not further described herein.

Figure 11:
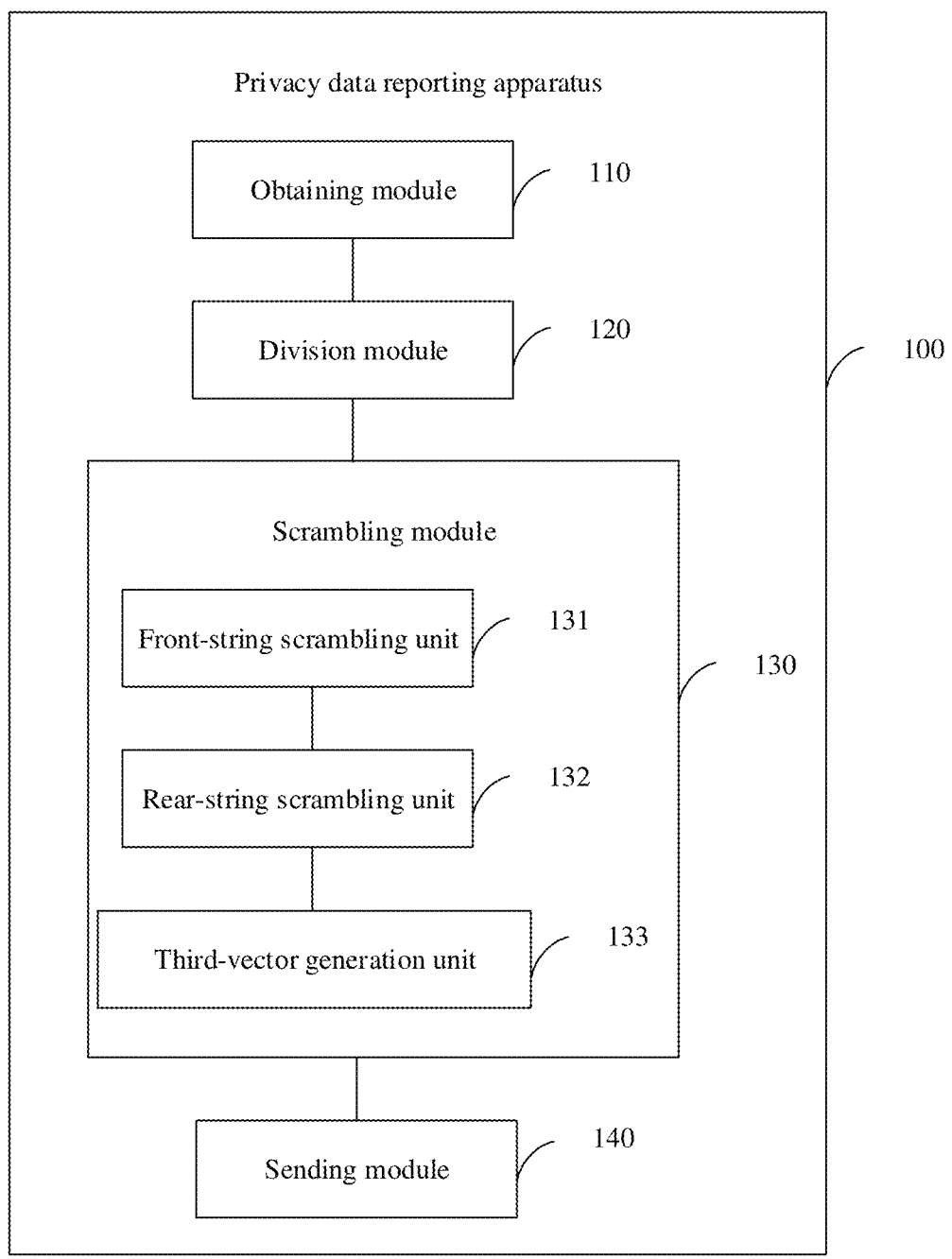
FIG. 11 is a framework diagram of a privacy data reporting apparatus according to Embodiment 3.

FIG. 11 is a framework diagram of a privacy data reporting apparatus according to Embodiment 3. Based on the foregoing embodiments, the scrambling module 130 further includes a third-vector generation unit 133.

The front-string scrambling unit 131 is configured to generate, based on the first hash value and a quantity m of elements in a preset Bloom filter vector, a first row vector with m elements, where the $(k1)^{th}$ element in the first row vector is 1, a remaining portion of elements are 0, a value of k1 is equal to the first hash value, and m is a positive integer.

The rear-string scrambling unit 132 is configured to generate, based on the second hash value and a quantity m of elements in a preset Bloom filter vector, a second row vector with m elements, where the (k2)$^{th}$ element in the second row vector is 1, a remaining portion of elements are 0, and a value of k2 is equal to the second hash value.

The third-vector generation unit 133 is configured to generate, based on a preset scrambling rate, a third row vector with m elements, where a proportion of elements 1 in the third row vector is equal to the preset scrambling rate, and the elements 1 and elements 0 in the third row vector are randomly and evenly distributed.

The front-string scrambling unit 131 is further configured to determine the scrambled front string data based on the first row vector and the third row vector.

The rear-string scrambling unit 132 is further configured to determine the scrambled rear string data based on the second row vector and the third row vector.

In a possible implementation of this embodiment, the front-string scrambling unit 131 is configured to perform an exclusive OR operation on the first row vector and the third row vector to generate the scrambled front string data; and the rear-string scrambling unit 132 is configured to perform an exclusive OR operation on the second row vector and the third row vector to generate the scrambled rear string data.

In another possible implementation of this embodiment, the rear-string scrambling unit 132 is configured to: perform an exclusive OR operation on the fourth row vector and the sixth row vector to generate a front-string scrambling vector; and perform an exclusive OR operation on the fifth row vector and the sixth row vector to generate a rear-string scrambling vector.

The apparatus in this embodiment may be used to execute the technical solutions of the foregoing method embodiments. The implementation principles and technical effects are similar, and are not further described herein.

Figure 12:
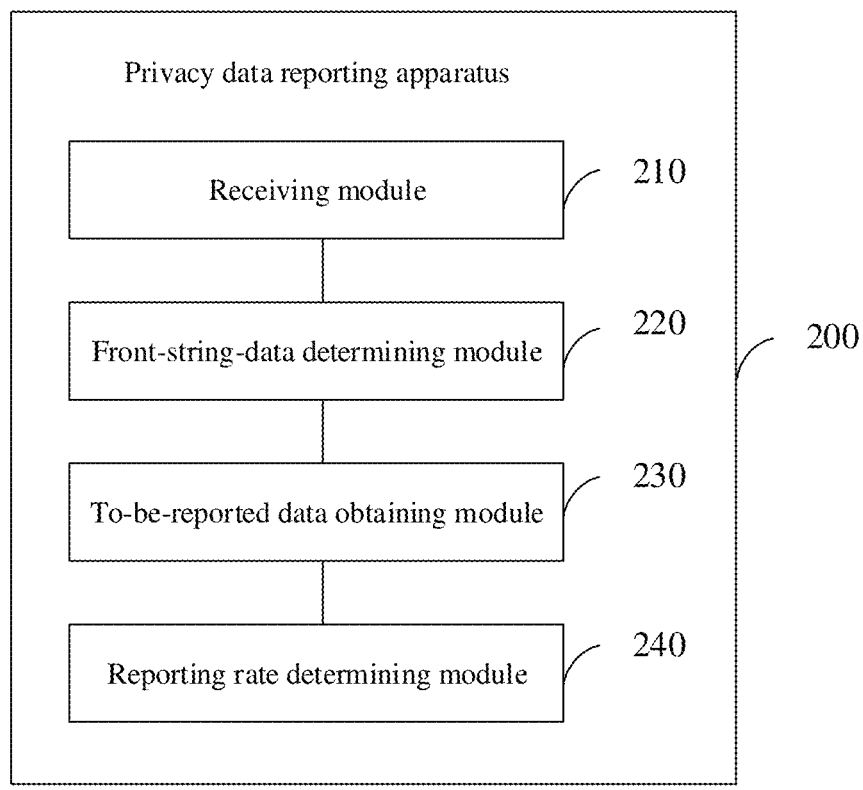
FIG. 12 is a framework diagram of a privacy data reporting apparatus according to Embodiment 1.

FIG. 12 is a framework diagram of a privacy data reporting apparatus according to Embodiment 1. The privacy data reporting apparatus 200 in this embodiment is a part of a server or the entire server. As shown in FIG. 12, the privacy data reporting apparatus 200 includes:

a receiving module 210, configured to receive privacy data sent by a plurality of terminal devices;

a front-string-data determining module 220, configured to determine N pieces of first front string data, where a length of the first front string data is equal to an integer multiple of a preset step, and N is a positive integer;

a to-be-reported data obtaining module 230, configured to obtain M pieces of to-be-reported data based on a plurality of pieces of privacy data, the N pieces of first front string data, and rear string data of different lengths; and a reporting rate determining module 240, configured to: determine reporting rates of the M pieces of to-be-reported data based on the plurality of pieces of privacy data, and determine to-be-reported data whose reporting rate is greater than a first preset value as target to-be-reported data.

The apparatus in this embodiment may be used to execute the technical solutions of the foregoing method embodiments. The implementation principles and technical effects are similar, and are not further described herein.

Figure 13:
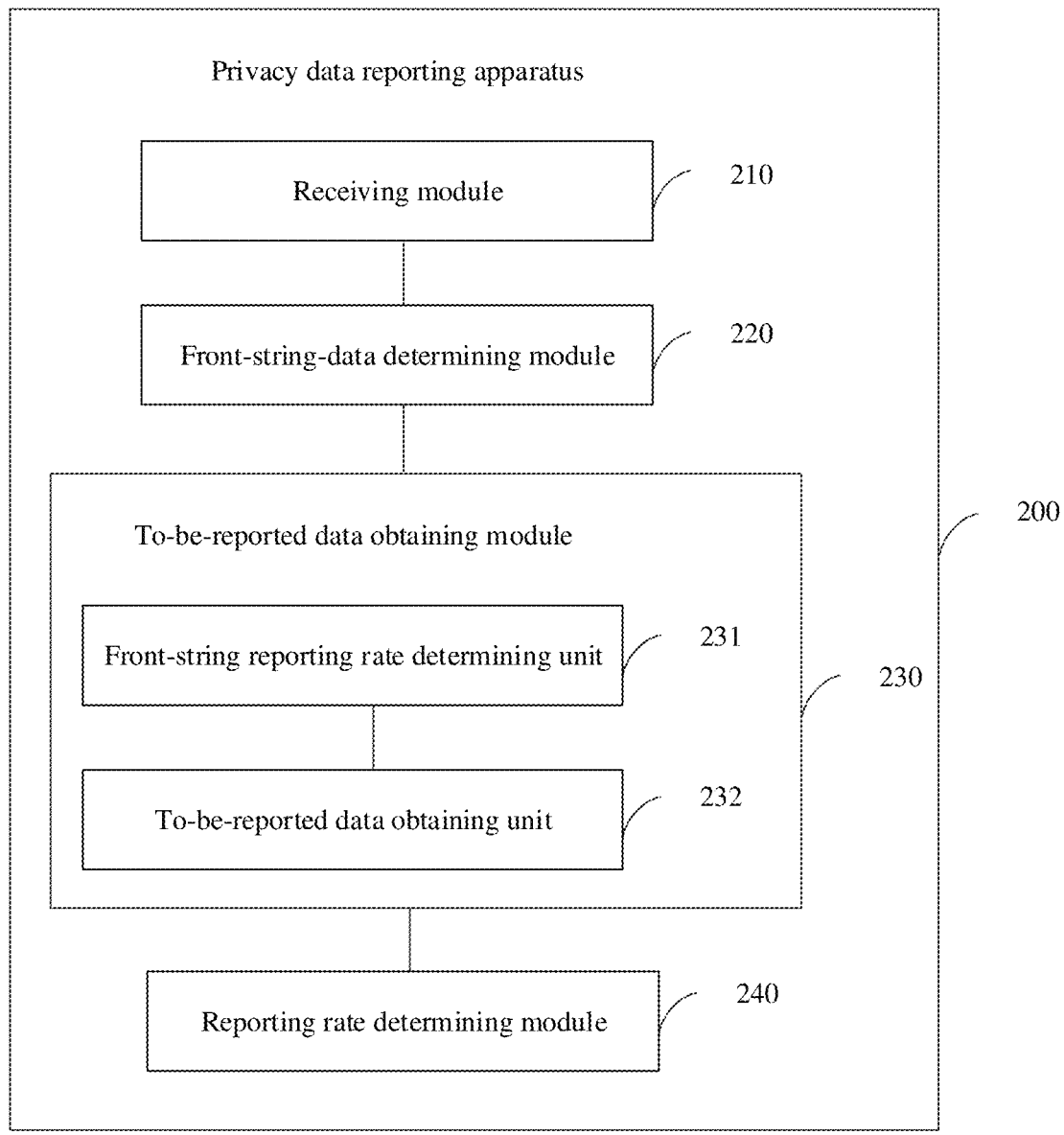
FIG. 13 is a framework diagram of a privacy data reporting apparatus according to Embodiment 2.

FIG. 13 is a framework diagram of a privacy data reporting apparatus according to Embodiment 2. Based on the foregoing embodiment, as shown in FIG. 13, the to-be-reported data obtaining module 230 includes a front-string reporting rate determining unit 231 and a to-be-reported data obtaining unit 232.

The front-string reporting rate determining unit 231 is configured to determine a reporting rate of each piece of first front string data based on the plurality of pieces of privacy data.

The to-be-reported data obtaining unit 232 is configured to: use first front string data whose reporting rate is greater than a second preset value as second front string data, to obtain P pieces of second front string data in total; and form the M pieces of to-be-reported data by using all the second front string data and the rear string data of different lengths.

The apparatus in this embodiment may be used to execute the technical solutions of the foregoing method embodiments. The implementation principles and technical effects are similar, and are not further described herein.

Figure 14:
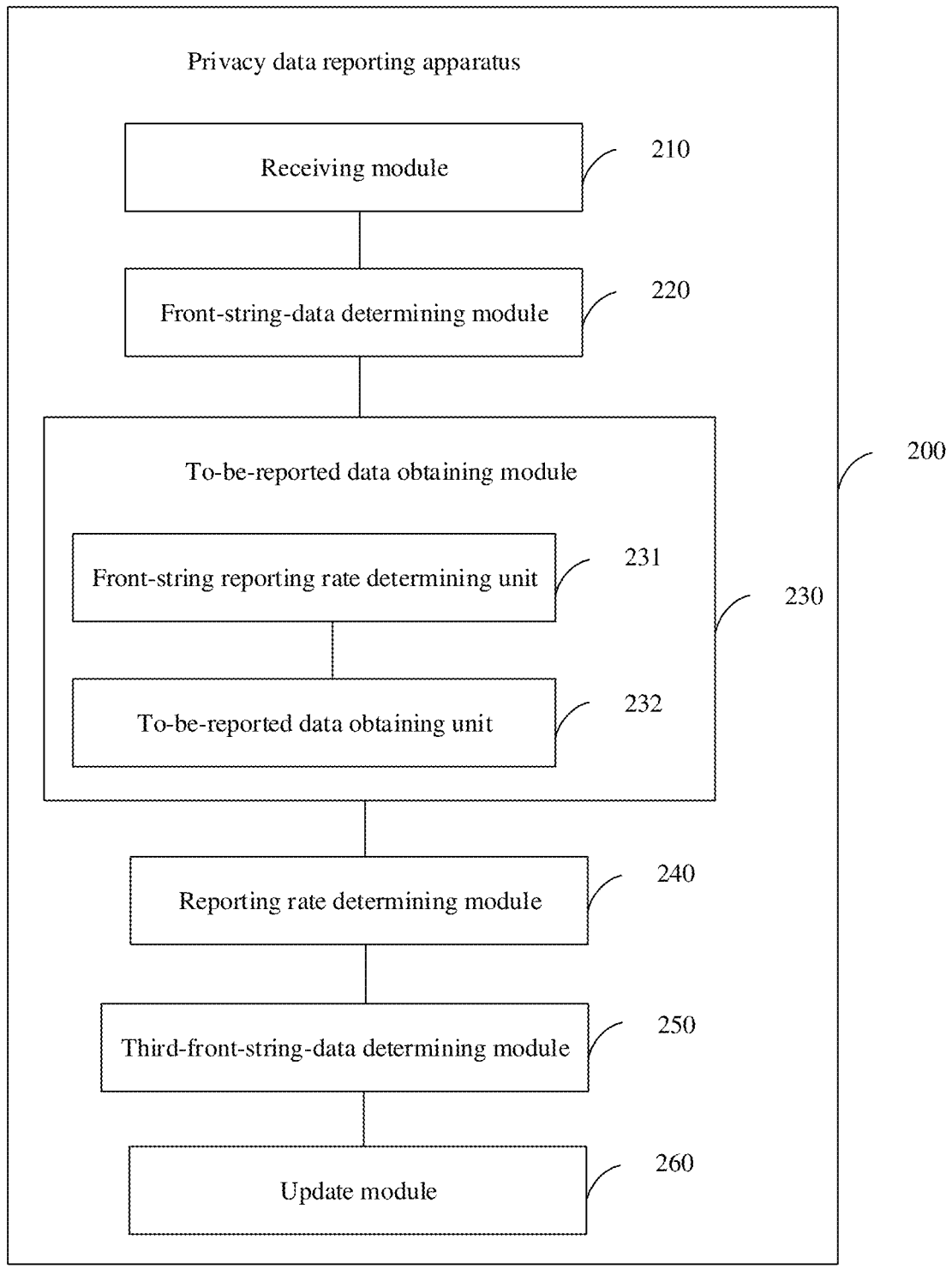
FIG. 14 is a framework diagram of a privacy data reporting apparatus according to Embodiment 3.

FIG. 14 is a framework diagram of a privacy data reporting apparatus according to Embodiment 3. Based on the foregoing embodiments, as shown in FIG. 14, the privacy data reporting apparatus 200 in this embodiment further includes a third-front-string-data determining module 250 and an updating module 260.

The third-front-string-data determining module 250 is configured to: if a length of the second front string data is less than a preset length value, determine H pieces of third front string data from the P pieces of second front string data based on a reporting rate of each piece of second front string data and a reporting rate of to-be-reported data corresponding to the second front string data.

The updating module 260 is configured to: separately add different data with the preset step to a tail part of each of the H pieces of third front string data to obtain N pieces of fourth front string data, and update the N pieces of fourth front string data to the N pieces of first front string data.

In a possible implementation of this embodiment, the privacy data includes a length of front string data, a length of rear string data, scrambled front string data, scrambled rear string data, and hash functions corresponding to the scrambled front string data and the scrambled rear string data.

The apparatus in this embodiment may be used to execute the technical solutions of the foregoing method embodiments. The implementation principles and technical effects are similar, and are not further described herein.

Figure 15:
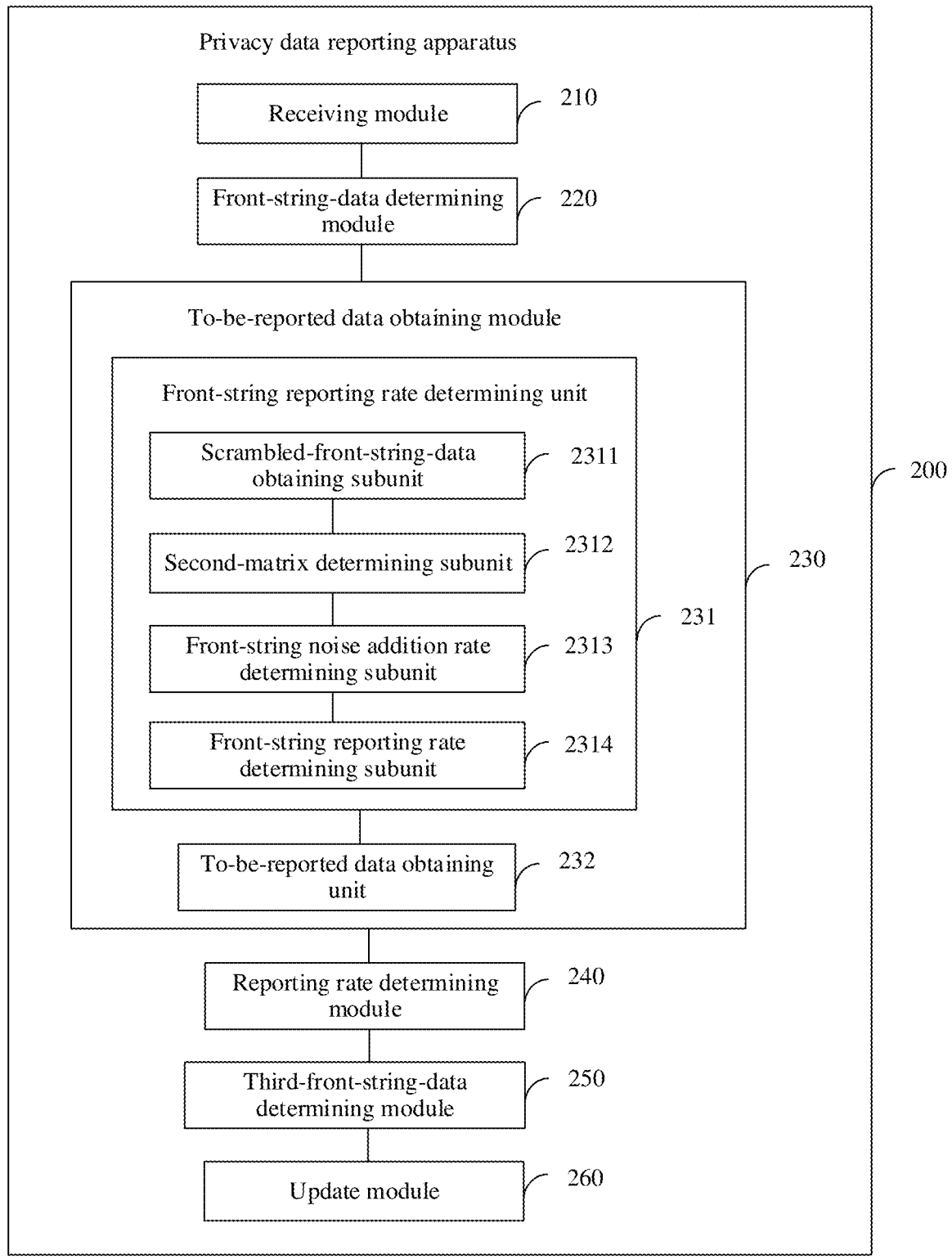
FIG. 15 is a framework diagram of a privacy data reporting apparatus according to Embodiment 4.

FIG. 15 is a framework diagram of a privacy data reporting apparatus according to Embodiment 4. Based on the foregoing embodiments, as shown in FIG. 15, the front-string reporting rate determining unit 231 in this embodiment includes a scrambled-front-string-data obtaining subunit 2311, a second-matrix determining subunit 2312, a front-string noise addition rate determining subunit 2313, and a front-string reporting rate determining subunit 2314.

The scrambled-front-string-data obtaining subunit 2311 is configured to obtain, from Q1 pieces of privacy data of the plurality of pieces of privacy data based on the length of the first front string data, Q1 pieces of scrambled front string data and hash functions corresponding to the Q1 pieces of scrambled front string data, where lengths of front string data in the Q1 pieces of privacy data are equal to the length of the first front string data.

The second-matrix determining subunit 2312 is configured to determine a second matrix based on the Q1 pieces of scrambled front string data and the hash functions corresponding to the Q1 pieces of scrambled front string data, where a quantity of rows of the second matrix is equal to a quantity Q2 of different hash functions in the Q1 hash functions, and the rows are in a one-to-one correspondence with the Q2 hash functions.

The front-string noise addition rate determining subunit 2313 is configured to: determine, for each piece of first front string data, Q2 hash values of the first front string data based on the Q2 different hash functions, and determine Q2 noise addition rates based on the Q2 hash values and the second matrix.

The front-string reporting rate determining subunit 2314 is configured to determine a reporting rate of the first front string data based on the Q2 noise addition rates.

In a possible implementation of this embodiment, the front-string noise addition rate determining subunit 2313 is configured to: obtain, for each hash value and from the second matrix, elements in a row corresponding to a hash function related to the hash value k3, and obtain the (k3)$^{th}$ element from the elements in the row, where the hash function related to the hash value k3 is a hash function that is used to obtain the hash value k3 based on the first front string data; obtain, from the Q1 pieces of scrambled front string data, a quantity Q3 of pieces of scrambled front string data corresponding to the hash function related to the hash value k3; and determine, based on the element and Q3, a noise addition rate corresponding to the hash value k3.

In another possible implementation of this embodiment, the front-string reporting rate determining subunit 2313 is configured to determine the reporting rate of the first front string data based on the Q2 noise addition rates and a first noise amplitude.

In another possible implementation of this embodiment, the front-string reporting rate determining subunit 2313 is further configured to: determine a difference between each of the Q2 noise addition rates and the first noise amplitude, and use a minimum value of ratios between Q2 differences and a second noise amplitude as the reporting rate of the first front string data, where the second noise amplitude is a difference between a constant and twice the first noise amplitude.

In another possible implementation of this embodiment, the second-matrix determining subunit 2312 is configured to: determine Q2 groups of scrambled front string data from the Q1 pieces of scrambled front string data, where each group of scrambled front string data is corresponding to a same hash function; add up data in each group of the Q2 groups of scrambled front string data based on corresponding bits to obtain Q2 row vectors in total; and form the second matrix by using the Q2 row vectors.

The apparatus in this embodiment may be used to execute the technical solutions of the foregoing method embodiments. The implementation principles and technical effects are similar, and are not further described herein.

Figure 16A:
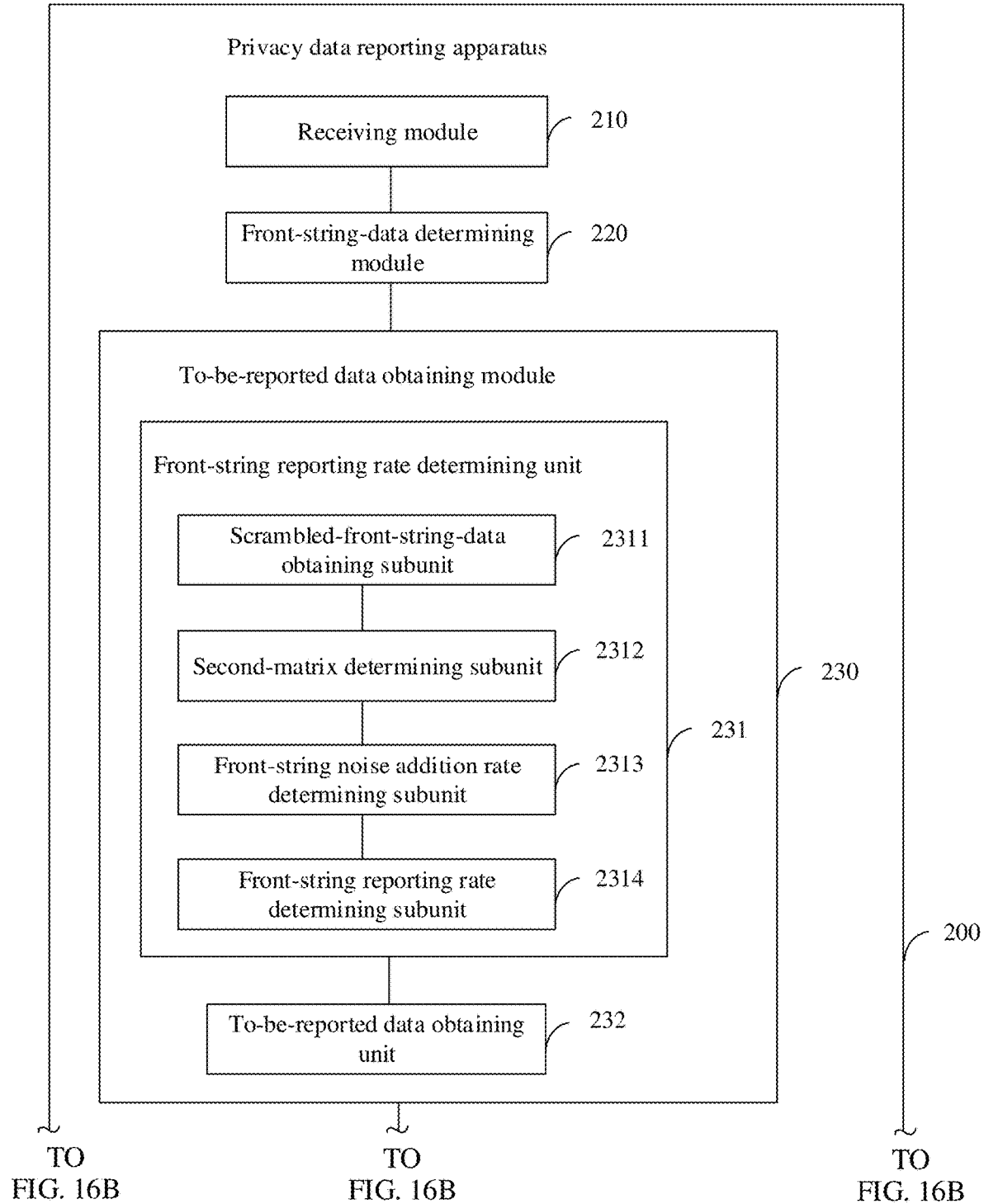
FIG. 16A and FIG. 16B are a framework diagram of a privacy data reporting apparatus according to Embodiment 5.
Figure 16B:
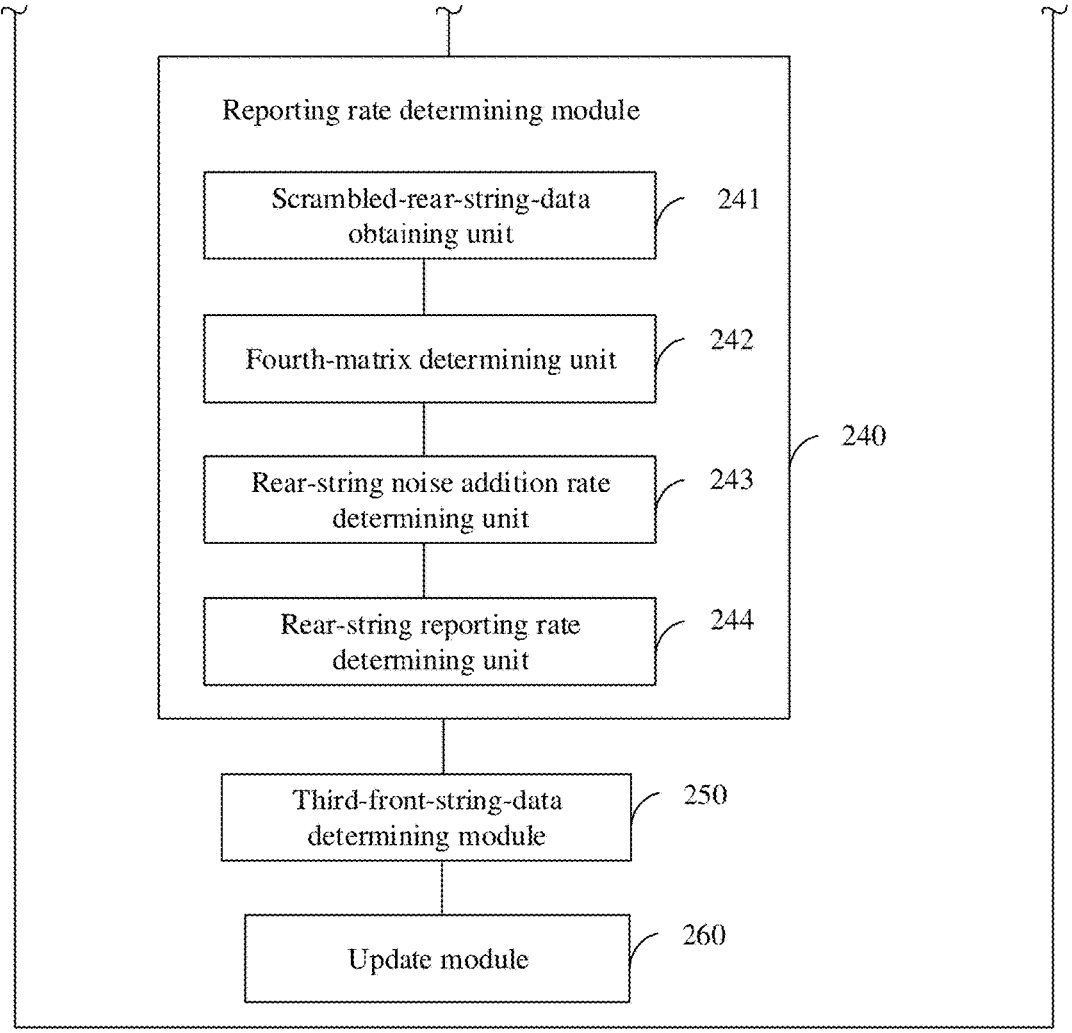

FIG. 16A and FIG. 16B illustrate a framework diagram of a privacy data reporting apparatus according to Embodiment 5. Based on the foregoing embodiments, as shown in FIG. 16A and FIG. 16B, the reporting rate determining module 240 in this embodiment includes a scrambled-rear-string-data obtaining unit 241, a fourth-matrix determining unit 242, a rear-string noise addition rate determining unit 243, and a rear-string reporting rate determining unit 244.

The scrambled-rear-string-data obtaining unit 241 is configured to: determine Q4 groups of to-be-reported data from the M pieces of to-be-reported data, where in each group of to-be-reported data, lengths of front string data are the same, and lengths of rear string data are the same; obtain, for each group of to-be-reported data and from Q5 pieces of second privacy data of the plurality of pieces of privacy data based on the lengths of the front string data and the rear string data in the group of to-be-reported data, Q5 pieces of scrambled rear string data and hash functions corresponding to the Q5 pieces of scrambled rear string data, where lengths of front string data in the Q5 pieces of second privacy data are equal to the length of the front string data in the group of to-be-reported data, and lengths of rear string data in the Q5 pieces of second privacy data are equal to the length of the rear string data in the group of to-be-reported data.

The fourth-matrix determining unit 242 is configured to determine a fourth matrix based on the Q5 pieces of scrambled rear string data and the hash functions corresponding to the Q5 pieces of scrambled rear string data, where a quantity of rows of the fourth matrix is equal to a quantity Q6 of different hash functions in the Q5 hash functions, and the rows are in a one-to-one correspondence with the Q6 hash functions.

The rear-string noise addition rate determining unit 243 is configured to: determine, for each piece of to-be-reported data in the group of to-be-reported data, Q6 hash values of the to-be-reported data based on the Q6 different hash functions, and determine Q6 noise addition rates based on the Q6 hash values and the fourth matrix.

The rear-string reporting rate determining unit 244 is configured to determine a reporting rate of the to-be-reported data based on the Q6 noise addition rates.

In a possible implementation of this embodiment, the rear-string noise addition rate determining unit 243 is configured to: obtain, for each hash value and from the fourth matrix, elements in a row corresponding to a hash function related to the hash value k4, and obtain the (k4)$^{th}$ element from the elements in the row, where the hash function related to the hash value k4 is a hash function that is used to obtain the hash value k4 based on the to-be-reported data; obtain, from the Q5 pieces of scrambled rear string data, a quantity Q7 of pieces of scrambled rear string data corresponding to the hash function related to the hash value k4; and determine, based on the element and Q7, a noise addition rate corresponding to the hash value k4.

In another possible implementation of this embodiment, the rear-string reporting rate determining unit 243 is configured to determine the reporting rate of the to-be-reported data based on the Q6 noise addition rates and a first noise amplitude.

In another possible implementation of this embodiment, the rear-string reporting rate determining unit 243 is configured to: determine a difference between each of the Q6 noise addition rates and the first noise amplitude, and use a minimum value of ratios between Q6 differences and a second noise amplitude as the reporting rate of the to-be-reported data, where the second noise amplitude is a difference between a constant and twice the first noise amplitude.

In another possible implementation of this embodiment, the fourth-matrix determining unit 242 is configured to: determine Q6 groups of scrambled rear string data from the Q5 pieces of scrambled rear string data, where each group of scrambled rear string data is corresponding to a same hash function; add up data in each group of the Q6 groups of scrambled rear string data based on corresponding bits to obtain Q6 row vectors in total; and form the fourth matrix by using the Q6 row vectors.

In another possible implementation of this embodiment, the third-front-string-data determining module 250 is configured to: determine a remaining reporting rate of each piece of second front string data based on the reporting rate of the second front string data and reporting rates of all to-be-reported data corresponding to the second front string data; and determine second front string data whose remaining reporting rate is greater than or equal to a third preset value as third front string data, to obtain the H pieces of third front string data.

In another possible implementation of this embodiment, the third-front-string-data determining module 250 is configured to: obtain, for each piece of second front string data, a sum of the reporting rates of all the to-be-reported data corresponding to the second front string data; and determine, as a remaining reporting rate of the second front string data, a difference between a reporting rate of the second front string data and the sum.

In another possible implementation of this embodiment, the length of the rear string data is less than or equal to the preset step.

The apparatus in this embodiment may be used to execute the technical solutions of the foregoing method embodiments. The implementation principles and technical effects are similar, and are not further described herein.

Figure 17:
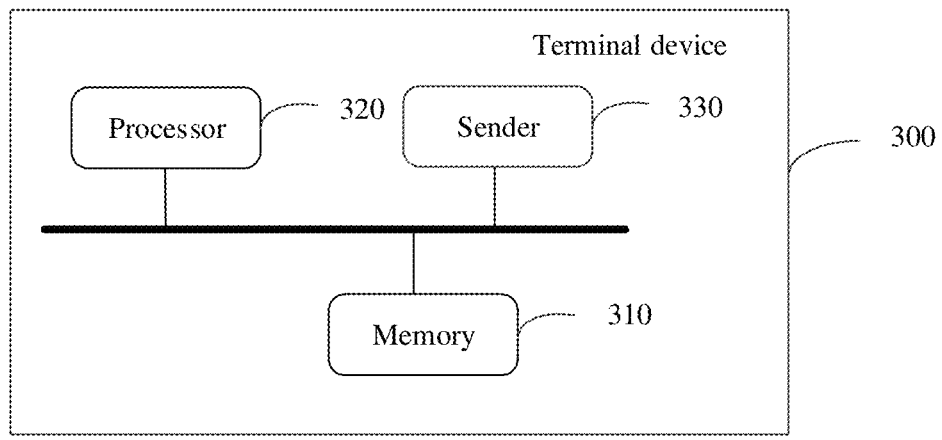
FIG. 17 is a schematic structural diagram of a terminal device according to an embodiment.

FIG. 17 is a schematic structural diagram of a terminal device according to an embodiment. As shown in FIG. 17, the terminal device 300 in this embodiment includes:

a memory 310, configured to store a computer program;

a processor 320, configured to execute the computer program to implement the foregoing privacy data reporting methods, where an implementation principle and technical effects thereof are similar to those of the privacy data reporting methods, and details are not described herein again; and a sender 330, configured to send privacy data generated by the processor 320 to a server.

Figure 18:
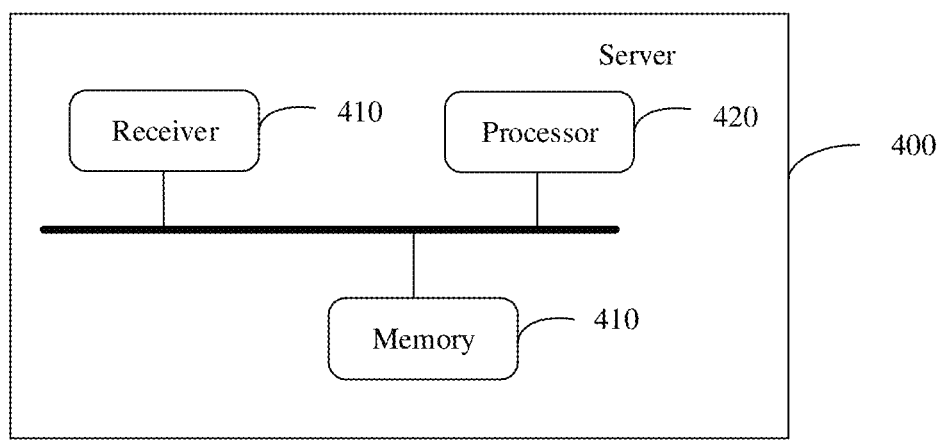
FIG. 18 is a schematic structural diagram of a server according to an embodiment.

FIG. 18 is a schematic structural diagram of a server according to an embodiment. As shown in FIG. 18, the terminal device 400 in this embodiment includes:

a receiver 410, configured to receive to-be-reported data sent by the terminal device;

a memory 420, configured to store a computer program; and a processor 430, configured to execute the computer program to implement the foregoing privacy data reporting methods, where an implementation principle and technical effects thereof are similar to those of the privacy data reporting methods, and details are not described herein again.

Further, when at least some functions in the privacy data reporting methods in the embodiments are implemented by using software, an embodiment further provides a computer storage medium. The computer storage medium is configured to store a computer software instruction used to report privacy data. When the computer software instruction is run on a computer, the computer is enabled to perform various possible privacy data reporting methods in the foregoing method embodiments. When the computer instructions are loaded and executed on the computer, the procedure or functions according to the embodiments are all or partially generated. The computer instruction may be stored in the computer storage medium, or may be transmitted from one computer storage medium to another computer storage medium. The computer software instruction may be transmitted to another website, computer, server, or data center in a wireless (for example, cellular communication, infrared, short-range wireless, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, an SSD).

What is claimed is:

1. A privacy data reporting method, comprising:
   obtaining, by a terminal device, to-be-reported data;
   dividing, based on a preset step, the to-be-reported data into front string data and rear string data, wherein a length of the front string data is an integer multiple of the preset step, and the rear string data is data in the to-be-reported data other than the front string data; and
   separately scrambling, according to a preset scrambling algorithm, the front string data and the rear string data, to generate privacy data, and sending the privacy data to a server.

2. The method according to claim 1, wherein the privacy data comprises scrambled front string data and scrambled rear string data, and the separately scrambling, according to the preset scrambling algorithm, the front string data and the rear string data, to generate privacy data comprises:
   determining, based on a preset hash function, a first hash value corresponding to the front string data and a second hash value corresponding to the rear string data; and
   generating, according to the preset scrambling algorithm, scrambled front string data corresponding to the first hash value and scrambled rear string data corresponding to the second hash value.

3. The method according to claim 2, wherein the determining, based on the preset hash function, the first hash value corresponding to the front string data and the second hash value corresponding to the rear string data further comprises:
   determining, based on the preset hash function, the first hash value of the front string data; and
   determining, based on the preset hash function, the second hash value of data formed by the first hash value and the rear string data.

4. The method according to claim 2, wherein the privacy data further comprises the length of the front string data, a length of the rear string data, and the preset hash function.

5. The method according to claim 2, wherein the generating, according to the preset scrambling algorithm, scrambled front string data corresponding to the first hash value and the scrambled rear string data corresponding to the second hash value comprises:
   generating, based on the first hash value and a preset quantity m of elements in a Bloom filter vector, a first row vector with m elements, wherein the $(k1)^{th}$ element in the first row vector is 1, a remaining portion of elements are 0, a value of k1 is equal to the first hash value, and m is a positive integer;
   generating, based on the second hash value and a preset quantity m of elements in a Bloom filter vector, a second row vector with m elements, wherein the $(k2)^{th}$ element in the second row vector is 1, a remaining portion of elements are 0, and a value of k2 is equal to the second hash value;
   generating, based on a preset scrambling rate, a third row vector with m elements, wherein a proportion of elements 1 in the third row vector is equal to the preset scrambling rate, and the elements 1 and elements 0 in the third row vector are randomly and evenly distributed; and
   determining the scrambled front string data based on the first row vector and the third row vector, and determining the scrambled rear string data based on the second row vector and the third row vector.

6. A terminal device, comprising:
a memory, configured to store a computer program;
a processor, configured to execute the computer program to implement:
obtaining to-be-reported data;
dividing the to-be-reported data into front string data and rear string data, wherein a length of the front string data is an integer multiple of the preset step, and the rear string data is data in the to-be-reported data other than the front string data; and
separately scrambling, according to a preset scrambling algorithm, the front string data and the rear string data, to generate privacy data, and sending the privacy data to a server; and
a sender, configured to send privacy data generated by the processor to a server.

7. The terminal device according to claim 6, wherein the privacy data comprises scrambled front string data and scrambled rear string data;
the processor separately scrambles, according to a preset scrambling algorithm, the front string data and the rear string data, to generate privacy data;
the processor determines, based on a preset hash function, a first hash value corresponding to the front string data and a second hash value corresponding to the rear string data; and
the processor generates, according to the preset scrambling algorithm, scrambled front string data corresponding to the first hash value and scrambled rear string data corresponding to the second hash value.

8. The terminal according to claim 7, wherein the determining, based on the preset hash function, the first hash value corresponding to the front string data and the second hash value corresponding to the rear string data comprises:
the processor determines, based on the preset hash function, the first hash value of the front string data; and
the processor determines, based on the preset hash function, the second hash value of data formed by the first hash value and the rear string data.

9. The terminal device according to claim 7, wherein the privacy data further comprises the length of the front string data, a length of the rear string data, and the preset hash function.

10. The terminal device according to claim 7, wherein the generating, according to the preset scrambling algorithm, scrambled front string data corresponding to the first hash value and the scrambled rear string data corresponding to the second hash value comprises:
the processor generates, based on the first hash value and a preset quantity m of elements in a Bloom filter vector, a first row vector with m elements, wherein the $(k1)^{th}$ element in the first row vector is 1, a remaining portion of elements are 0, a value of k1 is equal to the first hash value, and m is a positive integer;
the processor generates, based on the second hash value and a preset quantity m of elements in a Bloom filter vector, a second row vector with m elements, wherein the $(k2)^{th}$ element in the second row vector is 1, a remaining portion of elements are 0, and a value of k2 is equal to the second hash value;
the processor generates, based on a preset scrambling rate, a third row vector with m elements, wherein a proportion of elements 1 in the third row vector is equal to the preset scrambling rate, and the elements 1 and elements 0 in the third row vector are randomly and evenly distributed; and
the processor determines the scrambled front string data based on the first row vector and the third row vector, and determining the scrambled rear string data based on the second row vector and the third row vector.

11. A server, comprising:
a receiver, configured to receive to-be-reported data sent by a terminal device;
a memory, configured to store a computer program;
a processor, configured to execute the computer program, to implement:
receiving privacy data sent by a plurality of terminal devices;
determining N pieces of first front string data, wherein a length of the first front string data is equal to an integer multiple of a preset step, and N is a positive integer;
obtaining M pieces of to-be-reported data based on a plurality of pieces of privacy data, the N pieces of first front string data, and rear string data of different lengths; and
determining reporting rates of the M pieces of to-be-reported data based on the plurality of pieces of privacy data, and determining to-be-reported data whose reporting rate is greater than a first preset value as target to-be-reported data.

12. The server according to claim 11, wherein the obtaining M pieces of to-be-reported data based on a plurality of pieces of privacy data, the N pieces of first front string data, and rear string data of different lengths comprises:
the processor determines a reporting rate of each piece of first front string data based on the plurality of pieces of privacy data;
the processor uses first front string data whose reporting rate is greater than a second preset value as second front string data, to obtain P pieces of second front string data in total; and
the processor forms the M pieces of to-be-reported data by using all the second front string data and the rear string data of different lengths.

13. The server according to claim 12, wherein:
if a length of the second front string data is less than a preset length value, the processor determines, based on a reporting rate of each piece of second front string data and a reporting rate of the to-be-reported data corresponding to the second front string data, H pieces of third front string data from the P pieces of second front string data; and
the processor separately adds different data of the preset step to a tail part of each of the H pieces of third front string data, to obtain N pieces of fourth front string data, and updating the N pieces of fourth front string data to the N pieces of first front string data.

14. The server according to claim 11, wherein the privacy data comprises a length of front string data, a length of the rear string data, scrambled front string data, scrambled rear string data, and hash functions corresponding to the scrambled front string data and scrambled rear string data.

15. The server according to claim 14, wherein the determining the reporting rate of each piece of first front string data based on the plurality of pieces of privacy data comprises:
obtaining, from Q1 pieces of privacy data of the plurality of pieces of privacy data based on the length of the first front string data, Q1 pieces of scrambled front string data and hash functions corresponding to the Q1 pieces of scrambled front string data, wherein lengths of front string data in the Q1 pieces of privacy data are equal to the length of the first front string data;

determining a second matrix based on the Q1 pieces of scrambled front string data and the hash functions corresponding to the Q1 pieces of scrambled front string data, wherein a quantity of rows of the second matrix is equal to a quantity Q2 of different hash functions in the Q1 hash functions, and the rows are in a one-to-one correspondence with the Q2 hash functions;

determining, for each piece of first front string data, Q2 hash values of the first front string data based on the Q2 different hash functions, and determining, based on the Q2 hash values and the second matrix, Q2 noise addition rates; and determining, based on the Q2 noise addition rates, the reporting rate of the first front string data.

16. The server according to claim 14, wherein the determining reporting rates of the M pieces of to-be-reported data based on the plurality of pieces of privacy data comprises:

the processor determines Q4 groups of to-be-reported data from the M pieces of to-be-reported data, wherein in each group of to-be-reported data, lengths of front string data are the same, and lengths of rear string data are the same;

the processor obtains, for each group of to-be-reported data and from Q5 pieces of second privacy data of the plurality of pieces of privacy data based on the lengths of the front string data and the rear string data in the group of to-be-reported data, Q5 pieces of scrambled rear string data and hash functions corresponding to the Q5 pieces of scrambled rear string data, wherein lengths of front string data in the Q5 pieces of second privacy data are equal to the length of the front string data in the group of to-be-reported data, and lengths of rear string data are equal to the length of the rear string data in the group of to-be-reported data;

the processor determines a fourth matrix based on the Q5 pieces of the scrambled rear string data and the hash functions corresponding to the Q5 pieces of scrambled rear string data, wherein a quantity of rows of the fourth matrix is equal to a quantity Q6 of different hash functions in the Q5 hash functions, and the rows are in a one-to-one correspondence with the Q6 hash functions;

the processor determines, for each piece of to-be-reported data in the group of to-be-reported data, Q6 hash values of the to-be-reported data based on the Q6 different hash functions, and determining, based on the Q6 hash values and the fourth matrix, Q6 noise addition rates; and the processor determines, based on the Q6 noise addition rates, a reporting rate of the to-be-reported data.

17. The server according to claim 15, wherein the determining, based on the Q2 hash values and the second matrix, Q2 noise addition rates comprises:

the processor obtains, for each hash value and from the second matrix, elements in a row corresponding to a hash function related to the hash value k3, and obtaining the $(k3)^{th}$ element from the elements in the row, wherein the hash function related to the hash value k3 is a hash function that is used to obtain the hash value k3 based on the first front string data;

the processor obtains, from the Q1 pieces of scrambled front string data, a quantity Q3 of scrambled front string data corresponding to the hash function related to the hash value k3; and the processor determines, based on the element and Q3, a noise addition rate corresponding to the hash value k3.

18. The server according to claim 15, wherein the determining, based on the Q2 noise addition rates, the reporting rate of the first front string data comprises:

the processor determines, based on the Q2 noise addition rates and a first noise amplitude, the reporting rate of the first front string data.

19. The server according to claim 18, wherein the determining, based on the Q2 noise addition rates and the first noise amplitude, the reporting rate of the first front string data comprises:

the processor determines a difference between each of the Q2 noise addition rates and the first noise amplitude; and the processor uses a minimum value of ratios between Q2 differences and a second noise amplitude as the reporting rate of the first front string data, wherein the second noise amplitude is a difference between a constant and twice the first noise amplitude.

20. The server according to claim 15, wherein the determining the second matrix based on the Q1 pieces of scrambled front string data and the hash functions corresponding to the Q1 pieces of scrambled front string data comprises:

the processor determines Q2 groups of scrambled front string data from the Q1 pieces of scrambled front string data, wherein each group of scrambled front string data is corresponding to a same hash function;

the processor adds up data in each group of the Q2 groups of scrambled front string data based on corresponding bits, to obtain Q2 row vectors in total; and the processor forms the second matrix by using the Q2 row vectors.

* * * * *